US012170426B2

(12) United States Patent
Fitzpatrick et al.

(10) Patent No.: US 12,170,426 B2
(45) Date of Patent: Dec. 17, 2024

(54) MODULAR TELECOMMUNICATIONS PLUG AND METHOD

(71) Applicant: COMMSCOPE TECHNOLOGIES LLC, Hickory, NC (US)

(72) Inventors: Brian J. Fitzpatrick, McKinney, TX (US); Jeffrey Allan Oberski, Lucas, TX (US)

(73) Assignee: CommScope Technologies LLC, Hickory, NC (US)

( * ) Notice: Subject to any disclaimer, the term of this patent is extended or adjusted under 35 U.S.C. 154(b) by 341 days.

(21) Appl. No.: 17/626,363

(22) PCT Filed: Jul. 10, 2020

(86) PCT No.: PCT/US2020/041617

§ 371 (c)(1),
(2) Date: Jan. 11, 2022

(87) PCT Pub. No.: WO2021/007520

PCT Pub. Date: Jan. 14, 2021

(65) Prior Publication Data

US 2022/0263272 A1 Aug. 18, 2022

Related U.S. Application Data

(60) Provisional application No. 62/873,715, filed on Jul. 12, 2019, provisional application No. 62/872,841, filed on Jul. 11, 2019.

(51) Int. Cl.
*H01R 13/6463* (2011.01)
*H01R 13/506* (2006.01)
(Continued)

(52) U.S. Cl.
CPC ....... *H01R 13/6463* (2013.01); *H01R 13/506* (2013.01); *H01R 13/5829* (2013.01);
(Continued)

(58) Field of Classification Search
CPC .. H01R 43/048; H01R 13/506; H01R 13/582; H01R 13/6463; H01R 24/64; H01R 2107/00; H01R 4/2429; H01R 4/6467
See application file for complete search history.

(56) References Cited

U.S. PATENT DOCUMENTS

| | | | |
|---|---|---|---|
| 5,888,100 | A | 3/1999 | Bofill et al. |
| 5,899,770 | A | 5/1999 | Ezawa |

(Continued)

FOREIGN PATENT DOCUMENTS

| | | | |
|---|---|---|---|
| CN | 1131828 | A | 9/1996 |
| EP | 1 014 498 | A2 | 6/2000 |

(Continued)

OTHER PUBLICATIONS

European Extended Search Report in Application 20836611.2, mailed Jun. 19, 2023, 6 pages.

(Continued)

*Primary Examiner* — Oscar C Jimenez
(74) *Attorney, Agent, or Firm* — Merchant & Gould P.C.

(57) ABSTRACT

A modular plug for terminating a telecommunications cable includes a housing, a plurality of wire contacts, and a wire manager fitted in an internal cavity of the housing. The wire manager includes internal walls shaping a central channel, opposing edges on the internal walls defining a gate in the central channel, and tabs projecting from the gate in the central channel. The tabs define an upper portion and a lower portion in the gate. A strain relief member attaches to the wire manager in an intermediate position to partially restrain the telecommunications cable relative to the wire manager, and is restrained by the housing in a final position to completely restrain the telecommunications cable relative to the wire manager.

43 Claims, 26 Drawing Sheets

(51) Int. Cl.

| | |
|---|---|
| ***H01R 13/58*** | (2006.01) |
| ***H01R 24/64*** | (2011.01) |
| ***H01R 43/048*** | (2006.01) |
| ***H01R 43/18*** | (2006.01) |
| ***H01R 107/00*** | (2006.01) |

(52) U.S. Cl.

CPC ........... *H01R 43/048* (2013.01); *H01R 43/18* (2013.01); *H01R 24/64* (2013.01); *H01R 2107/00* (2013.01)

(56) References Cited

U.S. PATENT DOCUMENTS

| | | | |
|---|---|---|---|
| 5,989,071 | A | 11/1999 | Larsen et al. |
| 6,056,586 | A | 5/2000 | Lin |
| 6,109,954 | A | 8/2000 | Lin |
| 6,238,231 | B1 | 5/2001 | Chapman et al. |
| 6,250,949 | B1 | 6/2001 | Lin |
| 6,280,232 | B1 | 8/2001 | Beecher et al. |
| 6,319,048 | B1 | 11/2001 | Aekins et al. |
| 6,358,092 | B1 | 3/2002 | Siemon et al. |
| 6,402,559 | B1 | 6/2002 | Marowsky et al. |
| 6,409,535 | B1 | 6/2002 | Marowsky et al. |
| 6,506,077 | B2 | 1/2003 | Nagel et al. |
| 6,565,262 | B2 | 5/2003 | Childers et al. |
| 6,579,116 | B2 | 6/2003 | Brennan et al. |
| 6,729,901 | B2 | 5/2004 | Aekins |
| 6,811,445 | B2 | 11/2004 | Caveney et al. |
| 7,018,241 | B2 | 3/2006 | Caveney et al. |
| 7,168,994 | B2 | 1/2007 | Caveney et al. |
| 7,175,468 | B1 | 2/2007 | Chang |
| 7,220,149 | B2 | 5/2007 | Pharney |
| 7,223,112 | B2 | 5/2007 | AbuGhazaleh et al. |
| 7,294,012 | B2 | 11/2007 | AbuGhazaleh et al. |
| 7,374,450 | B1 | 5/2008 | Chang |
| 7,384,298 | B2 | 6/2008 | Caveney et al. |
| 7,404,739 | B2 | 7/2008 | Shields et al. |
| 7,438,583 | B2 | 10/2008 | AbuGhazaleh et al. |
| 7,556,536 | B2 | 7/2009 | Caveney et al. |
| 7,621,772 | B1 | 11/2009 | Tobey |
| 7,874,865 | B2 | 1/2011 | Tobey |
| 7,972,183 | B1 | 7/2011 | Lin |
| 8,277,260 | B2 | 10/2012 | Caveney et al. |
| 8,348,702 | B2 | 1/2013 | Lin |
| 8,702,453 | B2 | 4/2014 | Caveney et al. |
| 9,054,440 | B2 | 6/2015 | Taylor et al. |
| 9,214,759 | B2 | 12/2015 | Mattson et al. |
| 9,413,154 | B2 | 8/2016 | Taylor et al. |
| 9,448,370 | B2 | 9/2016 | Xue et al. |
| 10,411,398 | B2 | 9/2019 | Pepe et al. |
| 11,158,980 | B2 | 10/2021 | Anderson et al. |
| 2002/0048990 | A1 | 4/2002 | Marowsky et al. |
| 2002/0142644 | A1 | 10/2002 | Aekins |
| 2004/0002252 | A1 | 1/2004 | Hirokawa et al. |
| 2005/0106929 | A1 | 5/2005 | Meckley et al. |
| 2006/0189200 | A1 | 8/2006 | Ma |
| 2011/0053431 | A1 | 3/2011 | Bopp et al. |
| 2012/0088412 | A1 | 4/2012 | Mattson et al. |
| 2012/0315786 | A1 | 12/2012 | Lin |
| 2013/0052860 | A1 | 2/2013 | Caveney et al. |
| 2013/0157500 | A1 | 6/2013 | Mattson et al. |
| 2015/0207283 | A1 | 7/2015 | Guitard et al. |
| 2015/0295350 | A1 | 10/2015 | Bragg |
| 2015/0340823 | A1 | 11/2015 | Stanislaw et al. |
| 2016/0036179 | A1 | 2/2016 | Bragg et al. |
| 2018/0226743 | A1 | 8/2018 | Pepe et al. |
| 2018/0226753 | A1 | 8/2018 | Patel |
| 2020/0176932 | A1 | 6/2020 | Anderson et al. |
| 2022/0115807 | A1 | 4/2022 | Anderson et al. |

FOREIGN PATENT DOCUMENTS

| | | | |
|---|---|---|---|
| EP | 1 188 204 | B1 | 8/2008 |
| WO | 2005/048412 | A1 | 5/2005 |
| WO | 2017/027722 | A1 | 2/2017 |

OTHER PUBLICATIONS

International Search Report and Written Opinion of the International Searching Authority for International Patent Application No. PCT/US2020/041617 mailed Nov. 5, 2020, 10 pages.

MODULAR TELECOMMUNICATIONS PLUG AND METHOD

CROSS-REFERENCE TO RELATED APPLICATIONS

This application is a National Stage Application of PCT/US2020/041617, filed on Jul. 10, 2020, which claims the benefit of U.S. Patent Application Ser. No. 62/872,841, filed on Jul. 11, 2019, and claims the benefit of U.S. Patent Application Ser. No. 62/873,715, filed on Jul. 12, 2019, the disclosures of which are incorporated herein by reference in their entireties. To the extent appropriate, a claim of priority is made to each of the above disclosed applications.

BACKGROUND

In the field of data communications, communications networks typically utilize telecommunications cable lines designed to maintain the integrity of signals being transmitted via the network. Telecommunications cable lines are typically connected into port or jack terminals using connector plugs that enable the cables to be easily connected and disconnected. The cable lines are typically comprised of pairs of twisted wires surrounded by a cable jacket. Quick connect cables are often constructed by securing a connector plug to the ends of the pairs of twisted wires and sliding the connector plug into a matching port terminal where it locks into place with a simple lever lock. An RJ45 type connector is one example.

Crosstalk can negatively affect signal integrity in the telecommunications cable lines. Crosstalk is unbalanced noise caused by capacitive and/or inductive coupling between parallel wires. Furthermore, existing connector plug arrangements can be difficult to terminate in the field. For these and other reasons, improvements are desirable.

SUMMARY

This disclosure relates generally to a modular plug for terminating a telecommunications cable. More particularly, the modular plug includes a wire manager that has a feature for guiding pairs of twisted wires from the telecommunications cable. The modular plug further includes a strain relief member that attaches to the wire manager to provide strain relief on the cable.

In one aspect, a modular plug for terminating a telecommunications cable comprises a housing defining an internal cavity. A plurality of wire contacts are configured to electrically connect to pairs of twisted wires in the telecommunications cable. A wire manager is fitted in the internal cavity of the housing. The wire manager includes internal walls shaping a central channel. Opposing edges on the internal walls define a gate in the central channel, the gate decreasing the width of the central channel from a first width to a second width. Tabs project from the gate in the central channel, and define an upper portion and a lower portion in the gate in the central channel. The internal walls are flexible in opposite directions to allow a first pair of twisted wires to be contained by the tabs in the lower portion of the gate in the central channel.

In another aspect, a modular plug for terminating a telecommunications cable comprises a housing defining an internal cavity. A plurality of wire contacts are configured to electrically connect to pairs of twisted wires in the telecommunications cable. A wire manager is fitted in the internal cavity of the housing. The modular plug further includes a strain relief member configured to attach to the wire manager in an intermediate position to partially restrain the telecommunications cable relative to the wire manager, and to be restrained by the housing in a final position to completely restrain the telecommunications cable relative to the wire manager.

In another aspect, a method of terminating a telecommunications cable with a modular plug comprises: attaching a wire manager to a terminal end of a telecommunications cable; attaching a strain relief member to the wire manager in an intermediate position; pressing a first pair of twisted wires from the telecommunications cable into a lower portion of a gate in a central channel of the wire manager; pressing a second pair of twisted wires from the telecommunications cable into an upper portion of the gate in the central channel of the wire manager; fitting the strain relief member and the wire manager into a housing; and crimping wire contacts into the first and second, pairs of twisted wires.

In another aspect, a modular plug for terminating a telecommunications cable comprises a housing defining an internal cavity; a plurality of wire contacts inserted into the housing; a wire manager fitted in the internal cavity of the housing; and a strain relief member configured to attach to the wire manager in an intermediate position to partially restrain the telecommunications cable relative to the wire manager, and to move into a final position when the wire manager is fitted into the housing to completely restrain the telecommunications cable relative to the wire manager.

In another aspect, a method of terminating a telecommunications cable with a modular plug comprises: attaching a wire manager to a terminal end of a telecommunications cable; attaching a strain relief member to the wire manager in an intermediate position; inserting first, second, third, and fourth pairs of twisted wires from the telecommunications cable into the wire manager; fitting the wire manager and the strain relief member into a housing causing the strain relief member to move from the intermediate position to a final position; and crimping wire contacts into the first, second, third, and fourth pairs of twisted wires.

In another aspect, a modular plug for terminating a telecommunications cable comprises: a housing; a wire manager fitted into the housing, the wire manager including: walls shaping at least a central channel; and opposing edges on the walls defining a gate in the central channel, wherein the gate is structured to contain a first pair of twisted wires in a lower portion of the gate and a second pair of twisted wires in an upper portion of the gate. In certain embodiments, the gate includes a separator feature that contains the first pair of twisted wires in the lower portion of the gate. In certain embodiments, the separator feature includes tabs that project from opposite sides of the gate. The gate enables the first pair of twisted wires to be pressed beyond the tabs, and thereafter be contained by the tabs in the lower portion.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Figure 1:
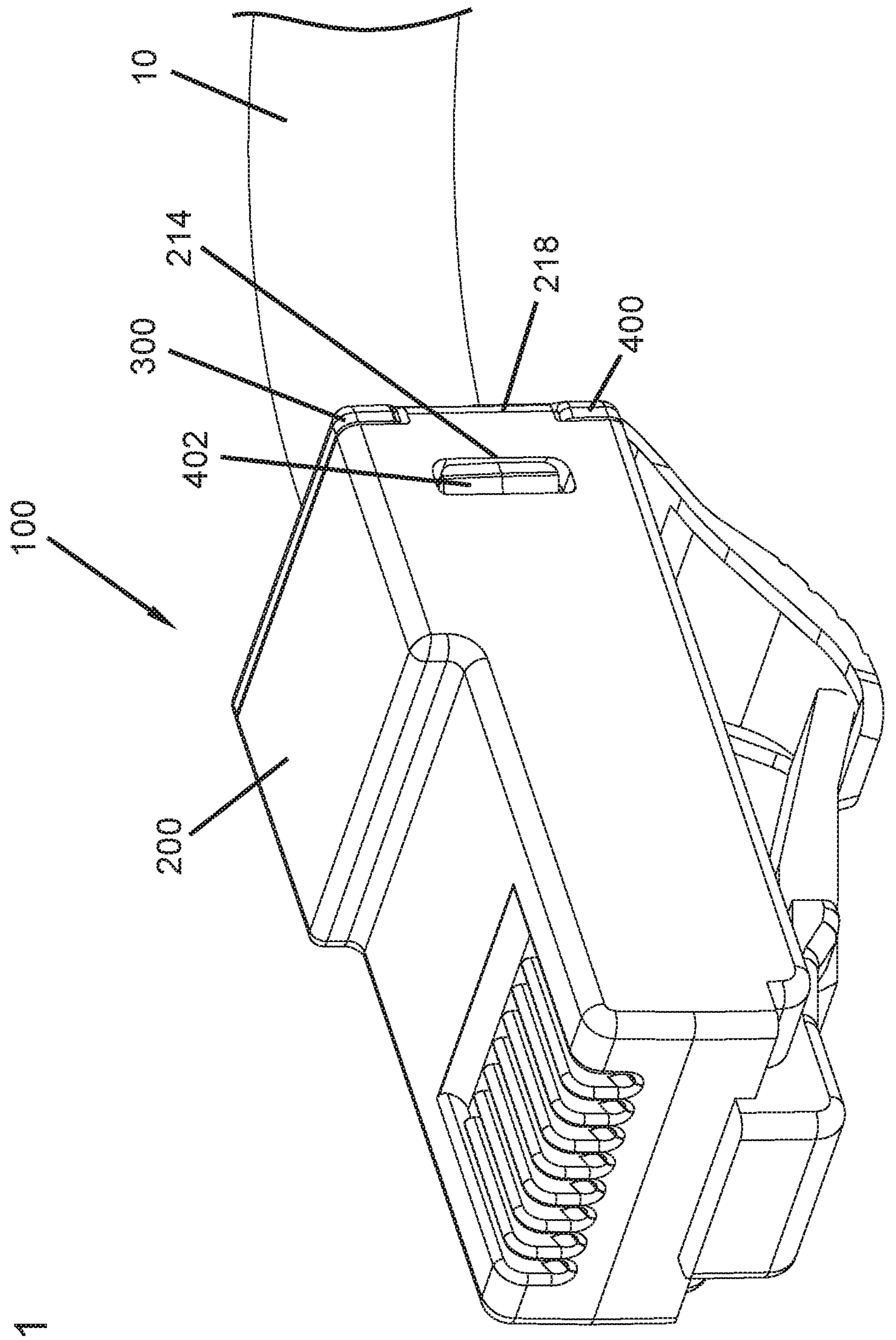
FIG. 1 is a perspective view of a telecommunications cable terminated by a modular plug.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
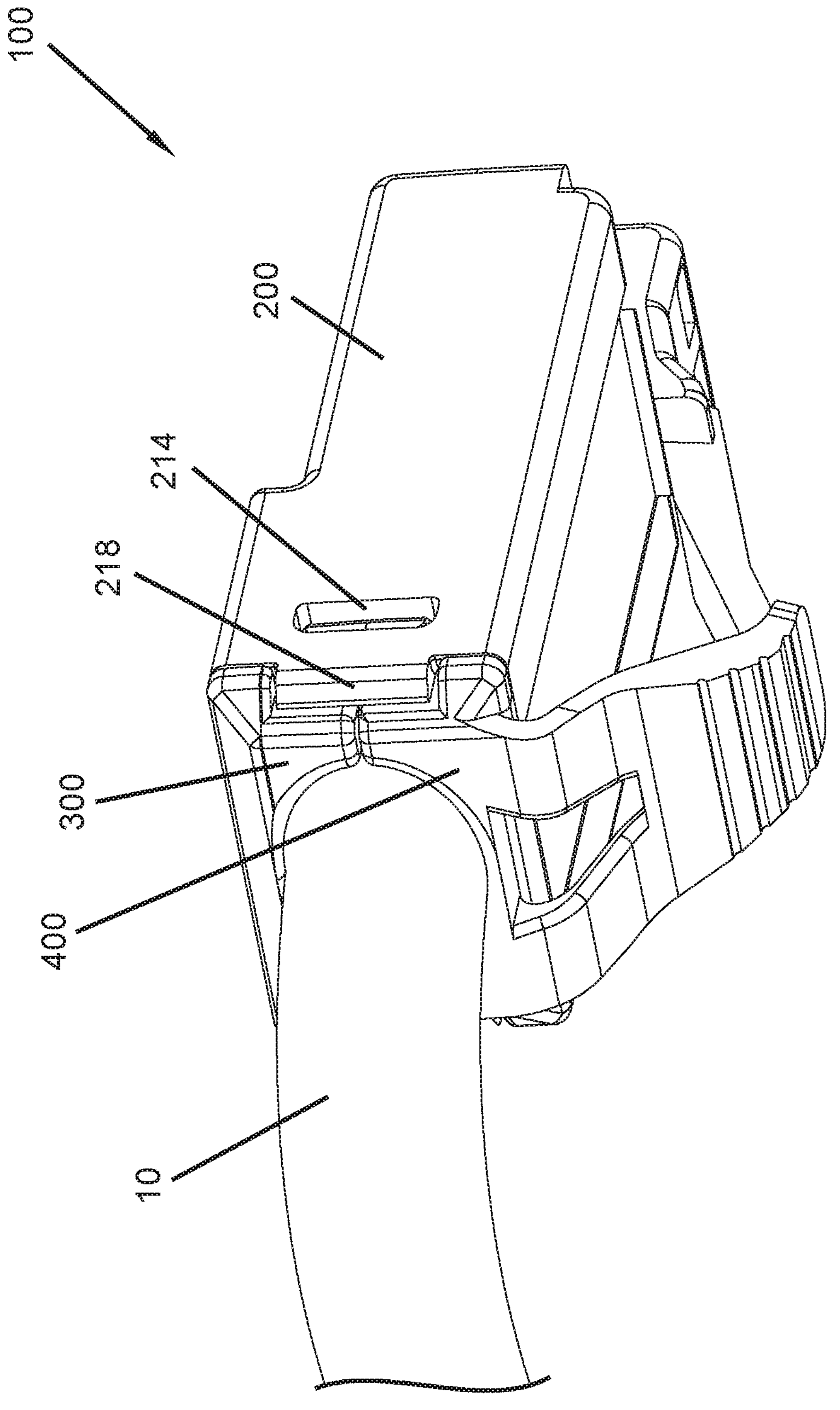
FIG. 2 is another perspective view of the telecommunications cable and modular plug.
Figure 3:
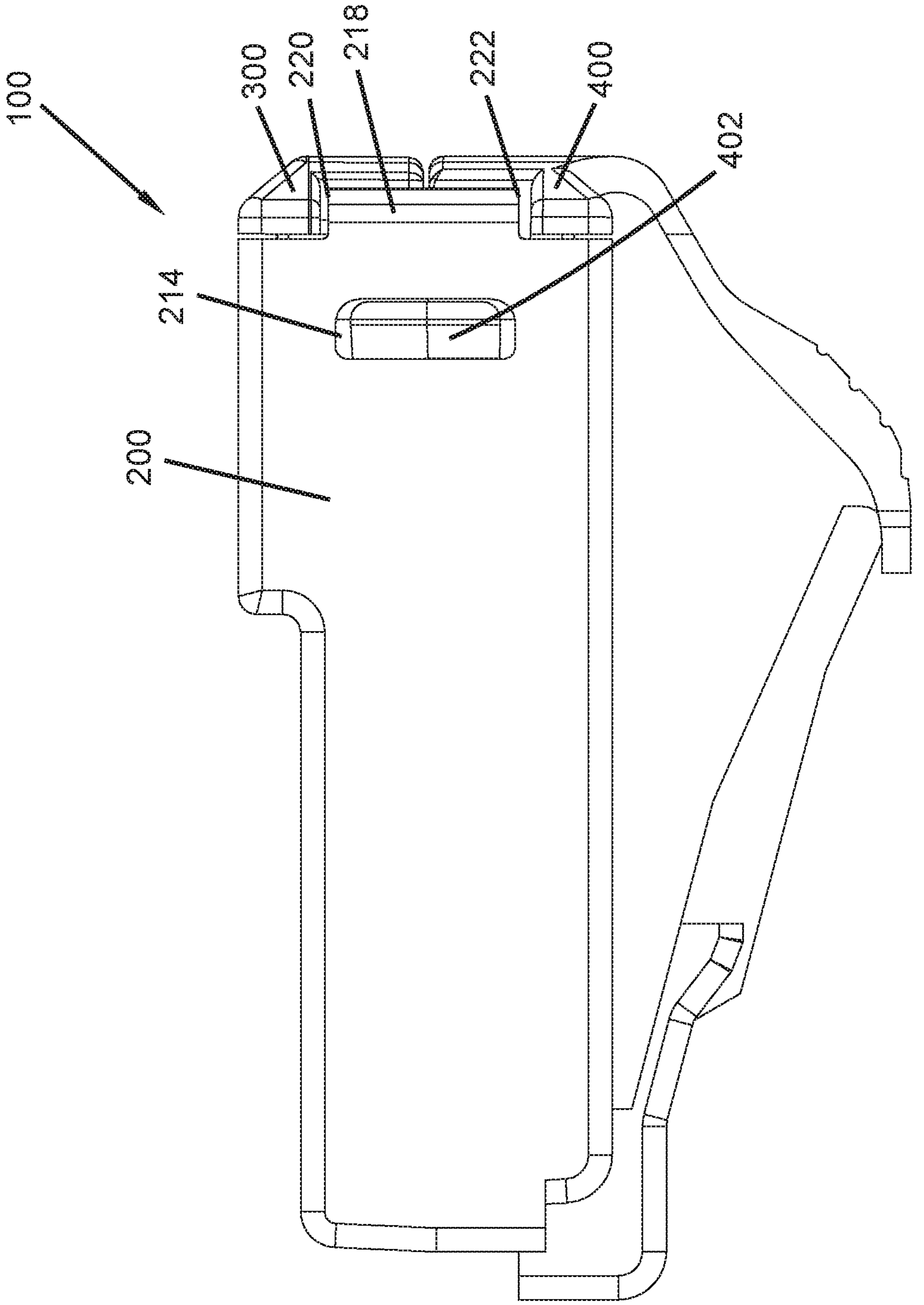
FIG. 3 is a right side view of the modular plug.
Figure 4:
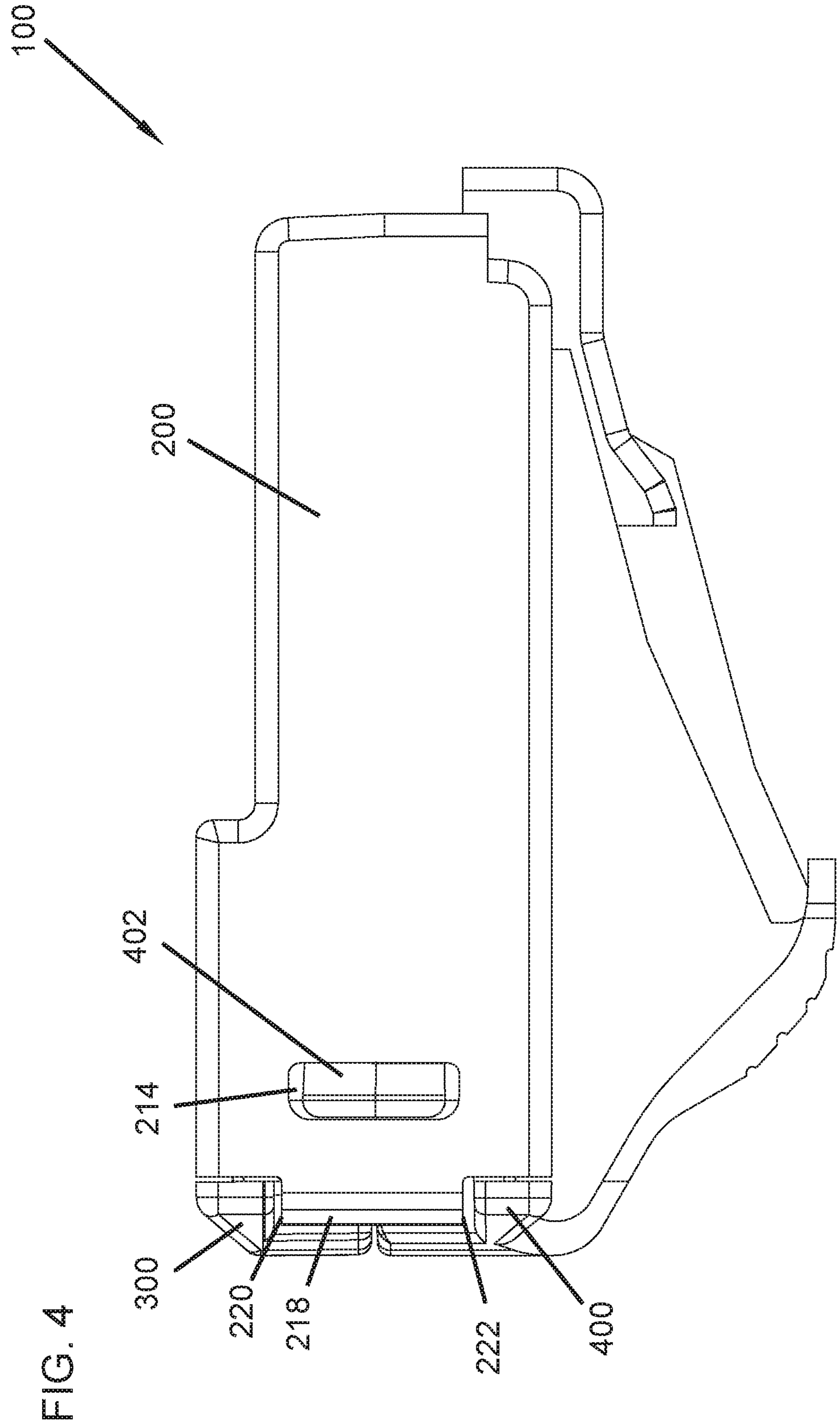
FIG. 4 is a left side view of the modular plug.
Figure 6:
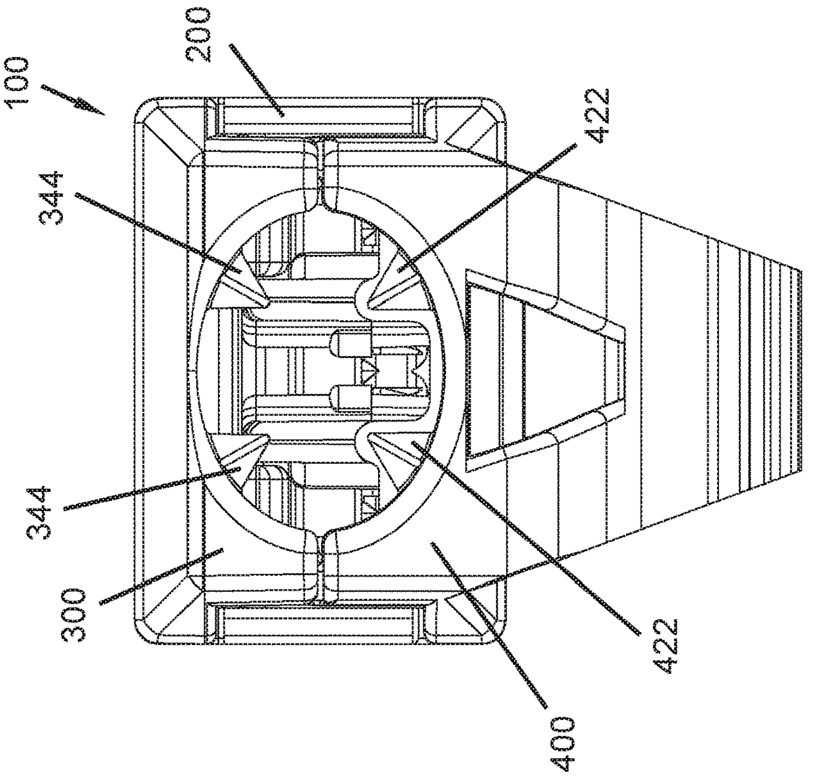
FIG. 6 is a rear view of the modular plug.
Figure 5:
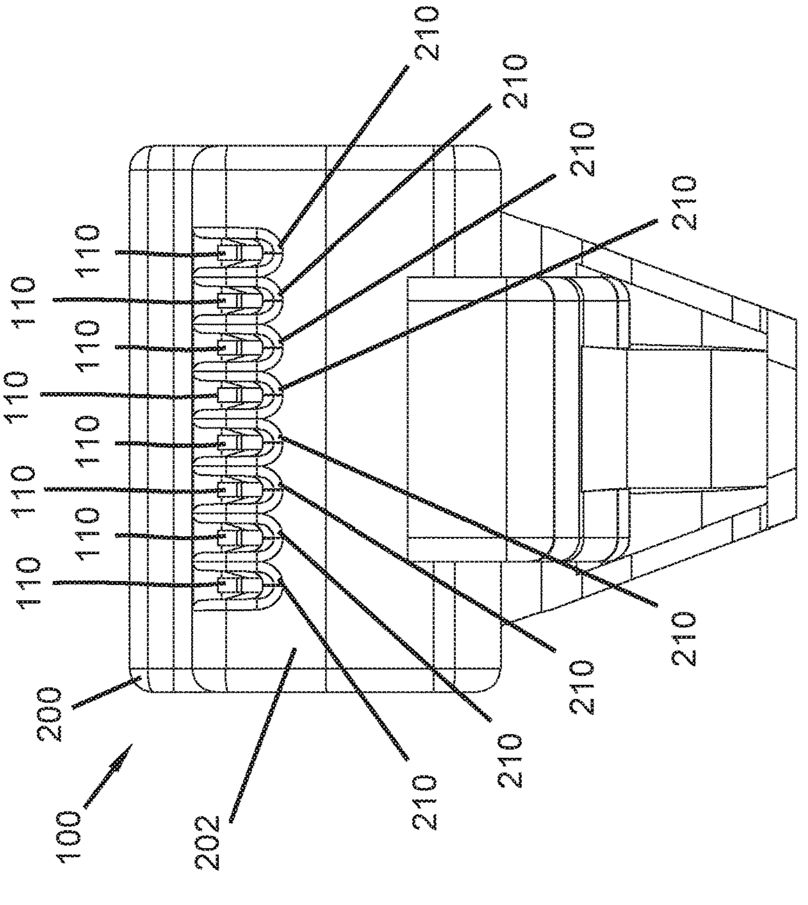
FIG. 5 is a front view of the modular plug.
Figure 7:
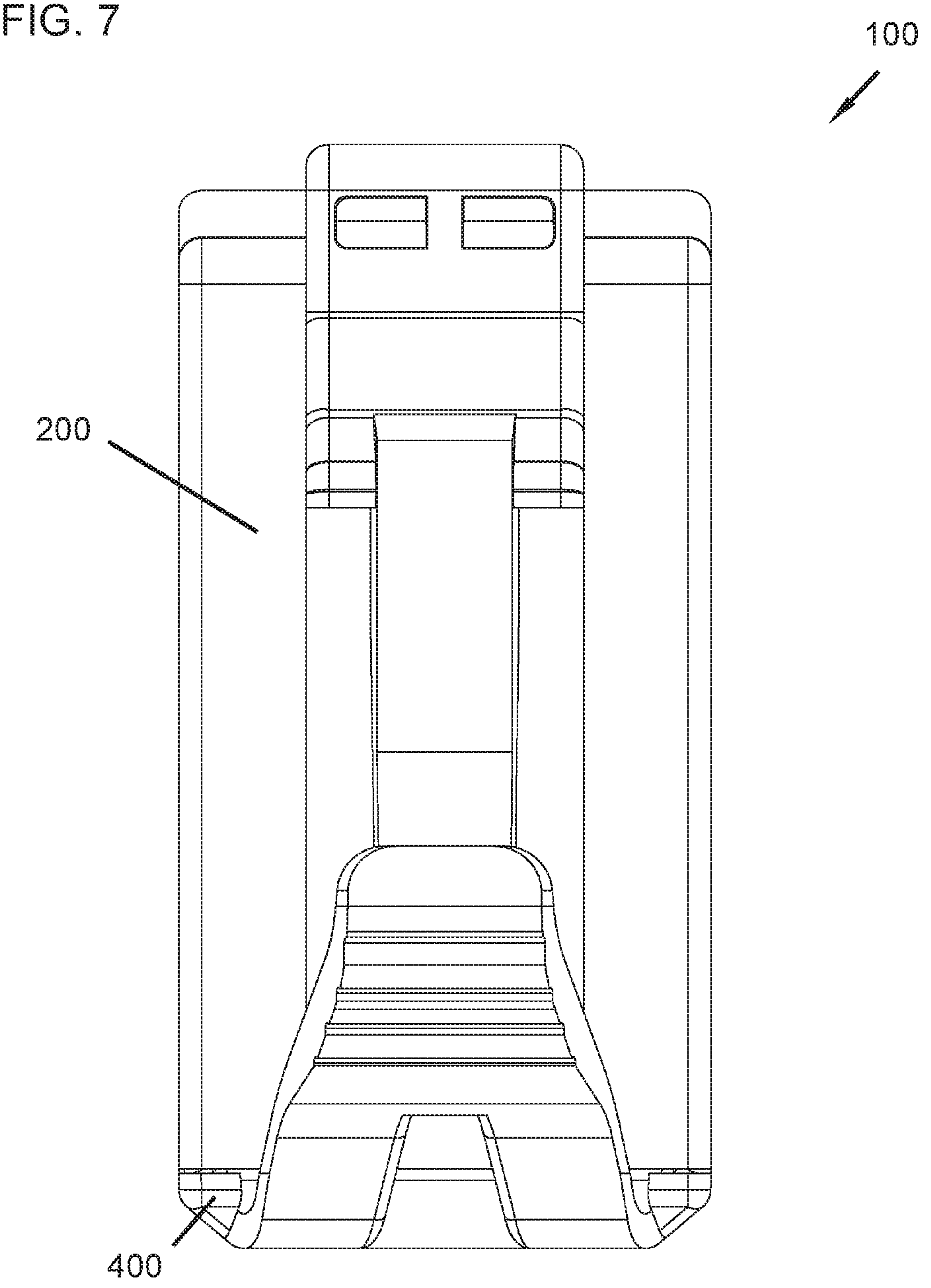
FIG. 7 is a bottom view of the modular plug.
Figure 8:
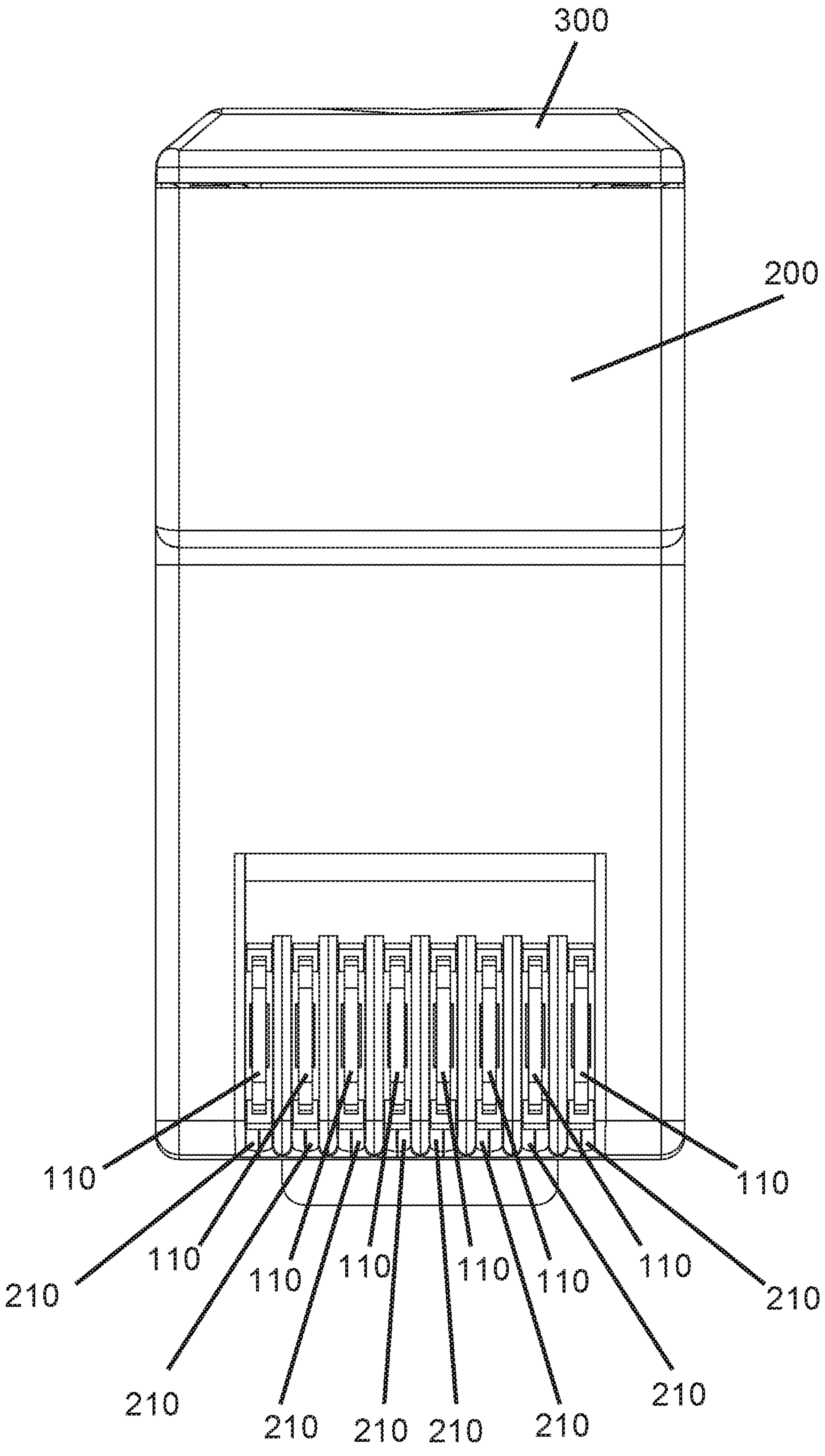
FIG. 8 is a top view of the modular plug.
Figure 9:
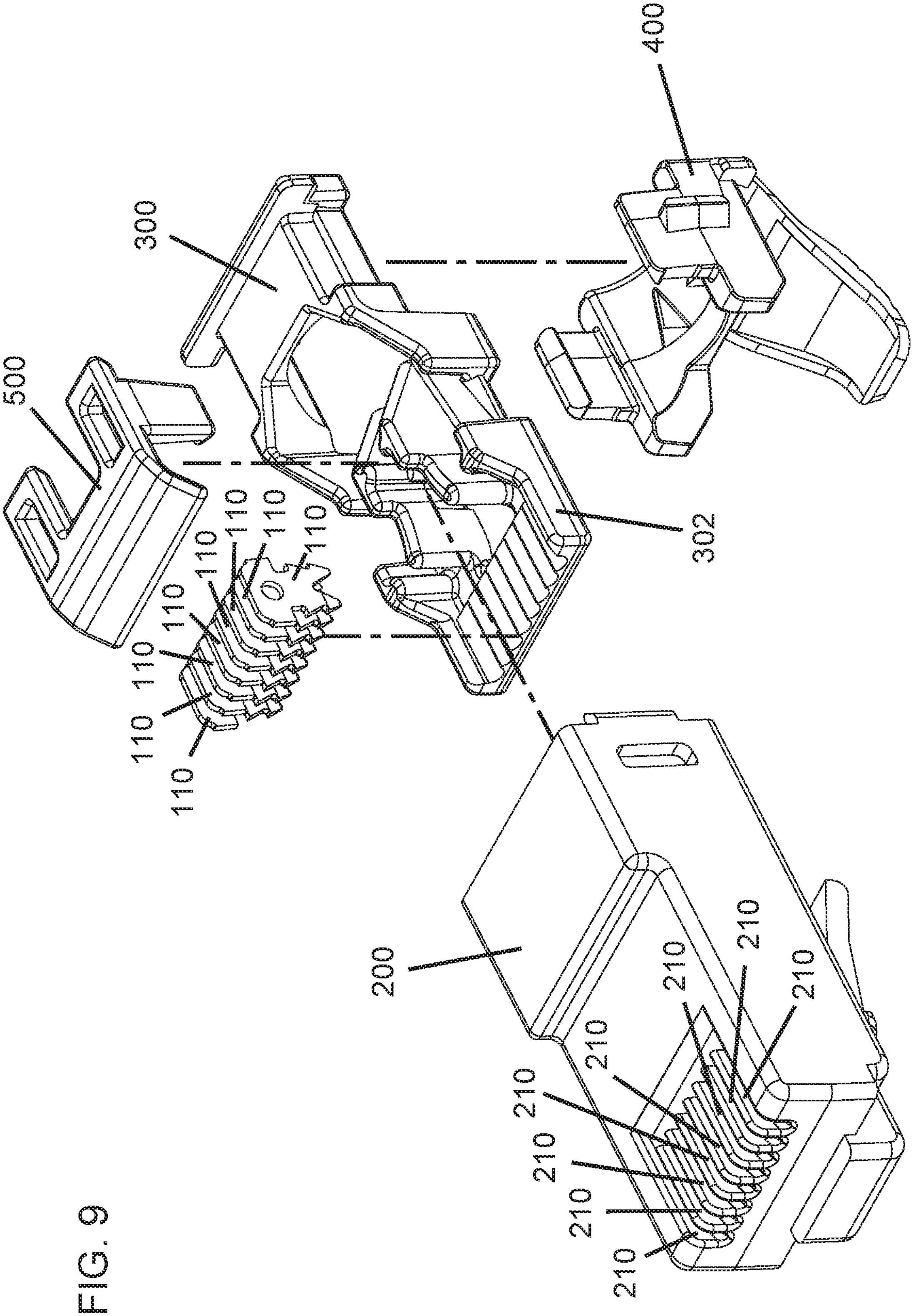
FIG. 9 is an exploded view of the modular plug.

FIGS. 1 and 2 are perspective views of a telecommunications cable 10 terminated by a modular plug 100. The telecommunications cable 10 includes pairs of twisted wires housed inside a protective outer jacket. The pairs of twisted wires are configured to transmit signals. For example, information such as video, audio, and data may be transmitted in the form of balanced signals over a pair of twisted wires. The transmitted signal is defined by the voltage difference between the wires. The telecommunications cable 10 includes four pairs of twisted wires.

As shown in FIGS. 1 and 2, the modular plug 100 is configured to terminate the telecommunications cable 10. In particular, the modular plug 100 is configured to terminate the pairs of twisted wires housed inside the jacket of the telecommunications cable 10.

FIGS. 3-9 depict right side, left side, front, rear, bottom, top, and exploded views, respectively, of the modular plug 100. As shown in FIGS. 3-9, the modular plug 100 includes a housing 200, a wire manager 300, a strain relief member 400, and a hood 500 (see exploded isometric view of FIG. 9). The housing 200, wire manager 300, strain relief member 400, and hood 500 snap-fit together in the assembly of the modular plug 100.

Figure 10:
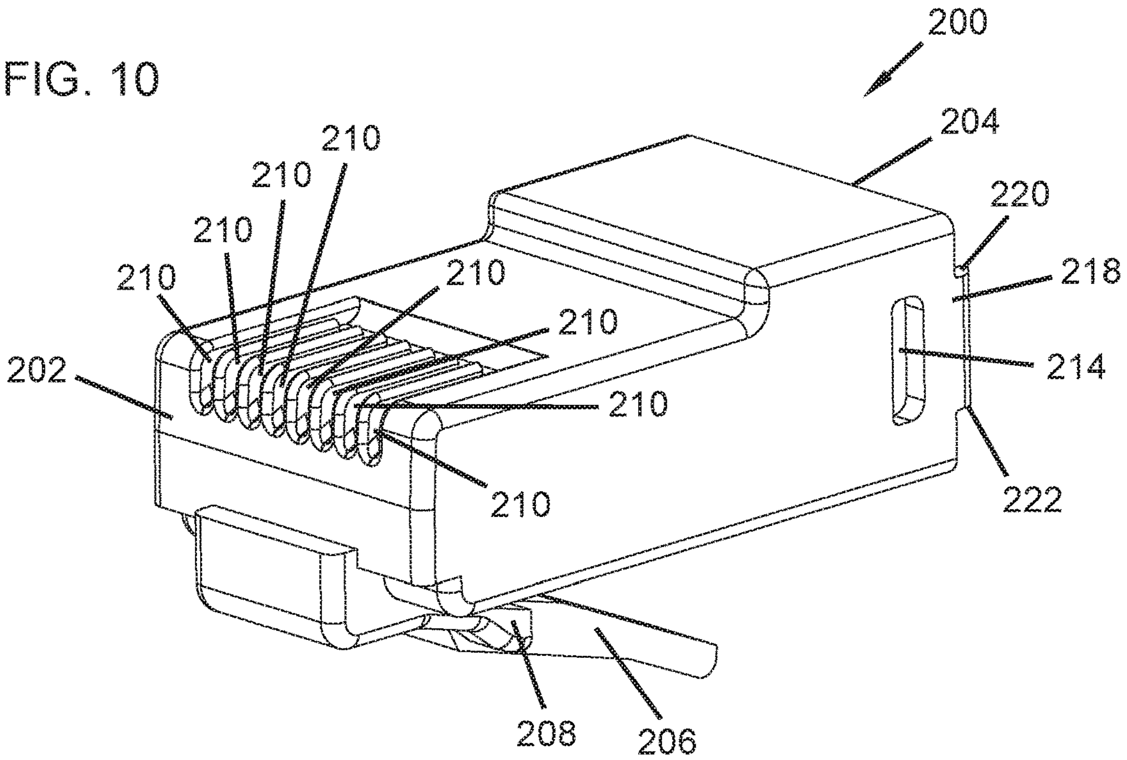
FIG. 10 is a front perspective view of a housing.
Figure 11:
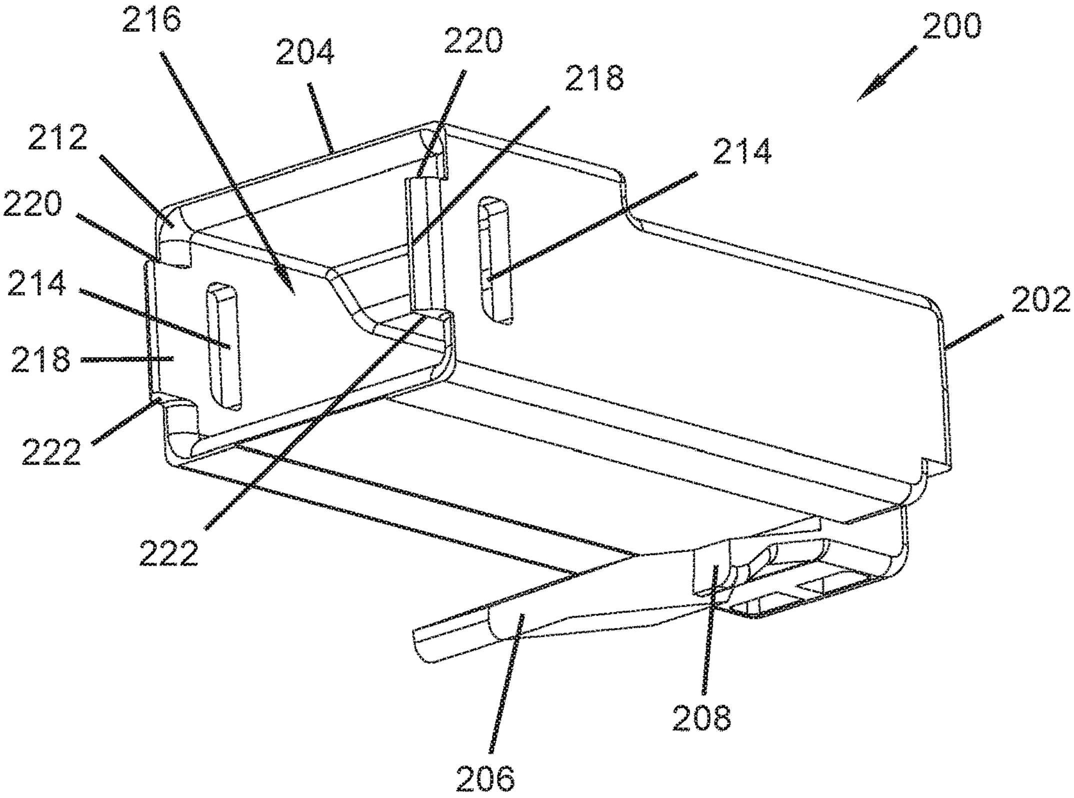
FIG. 11 is a rear perspective view of the housing.

FIGS. 10 and 11 are front and rear perspective views of the housing 200. The housing 200 extends from a front portion 202 to a rear portion 204. The housing 200 includes an opening 212 at the rear portion 204 that leads into an internal cavity 216. The internal cavity 216 houses the wire manager 300, strain relief member 400, and hood 500.

The housing 200 further includes an array of slots 210 along a leading edge of the front portion 202. As shown in FIGS. 1-9, the modular plug 100 includes a plurality of wire contacts 110 held by the housing 200. Each wire contact 110 is received by a slot 210 in the housing 200 and is configured to electrically connect the pairs of twisted wires in the telecommunications cable 10 to the contact springs of a telecommunications jack. A load bar 302 of the wire manager 300 (see FIG. 9) is configured to align the individual wires with the wire contacts 110. In the example shown, eight wire contacts 110 and eight slots 210 are illustrated. Accordingly, the modular plug 100 may correspond to an RJ-45 jack. Other configurations are possible.

Still referring to FIGS. 10 and 11, the housing 200 includes a latching handle 206 having shoulders 208. The latching handle 206 and shoulders 208 are configured to secure the modular plug 100 to a receptacle such as a telecommunications jack.

The housing 200 further includes slots 214 on opposite sides. The slots 214 receive corresponding tabs 402 of the strain relief member 400 such that the strain relief member 400 snap fits into the internal cavity 216 of the housing 200.

The housing 200 further includes flanges 218 opposite sides of the opening 212. A top portion 220 of each flange 218 faces the wire manager 300 and a bottom portion 222 of each flange 218 faces with the strain relief member 400 in the modular plug 100.

Figure 12:
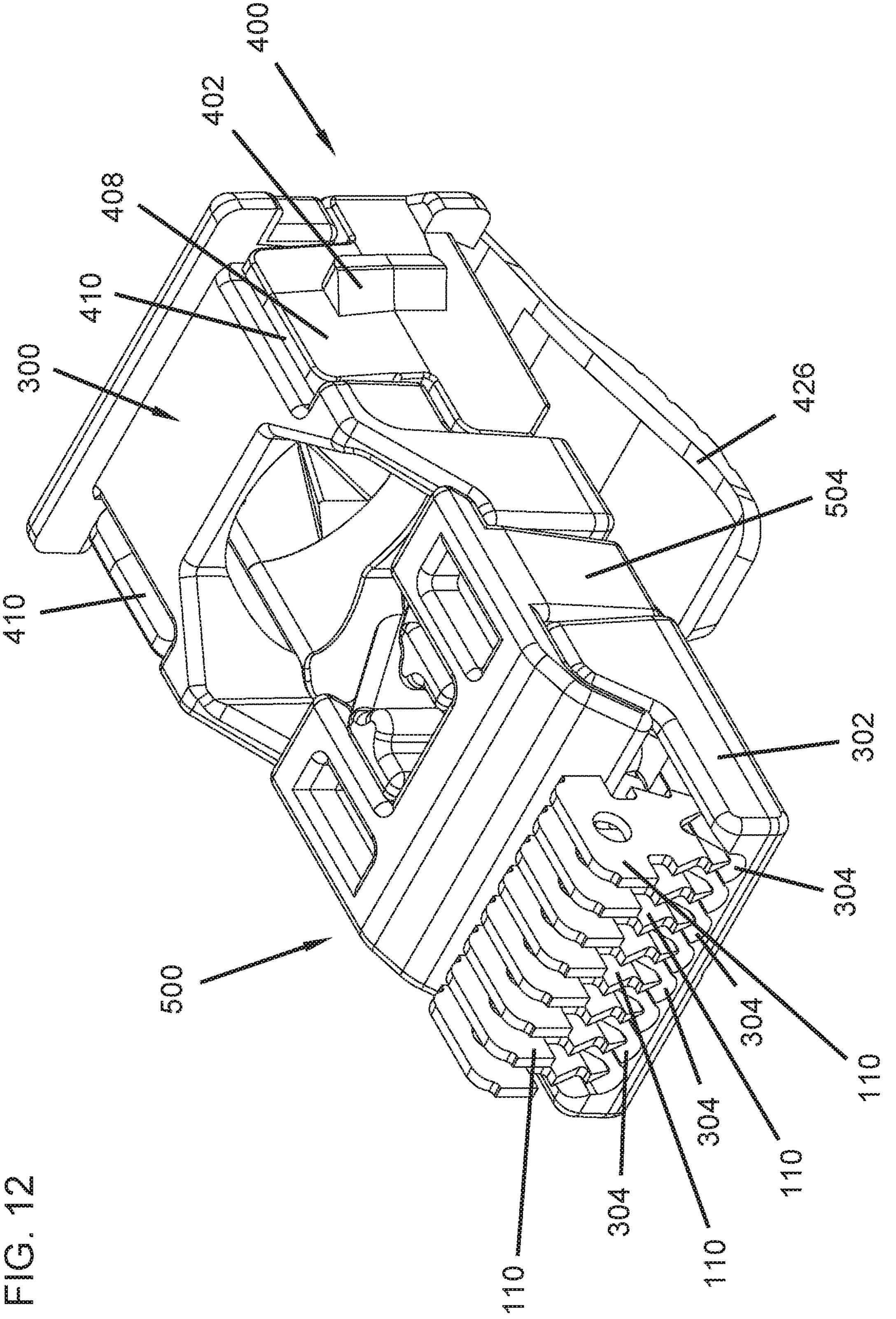
FIG. 12 is a perspective view of the modular plug with the housing removed.
Figure 13:
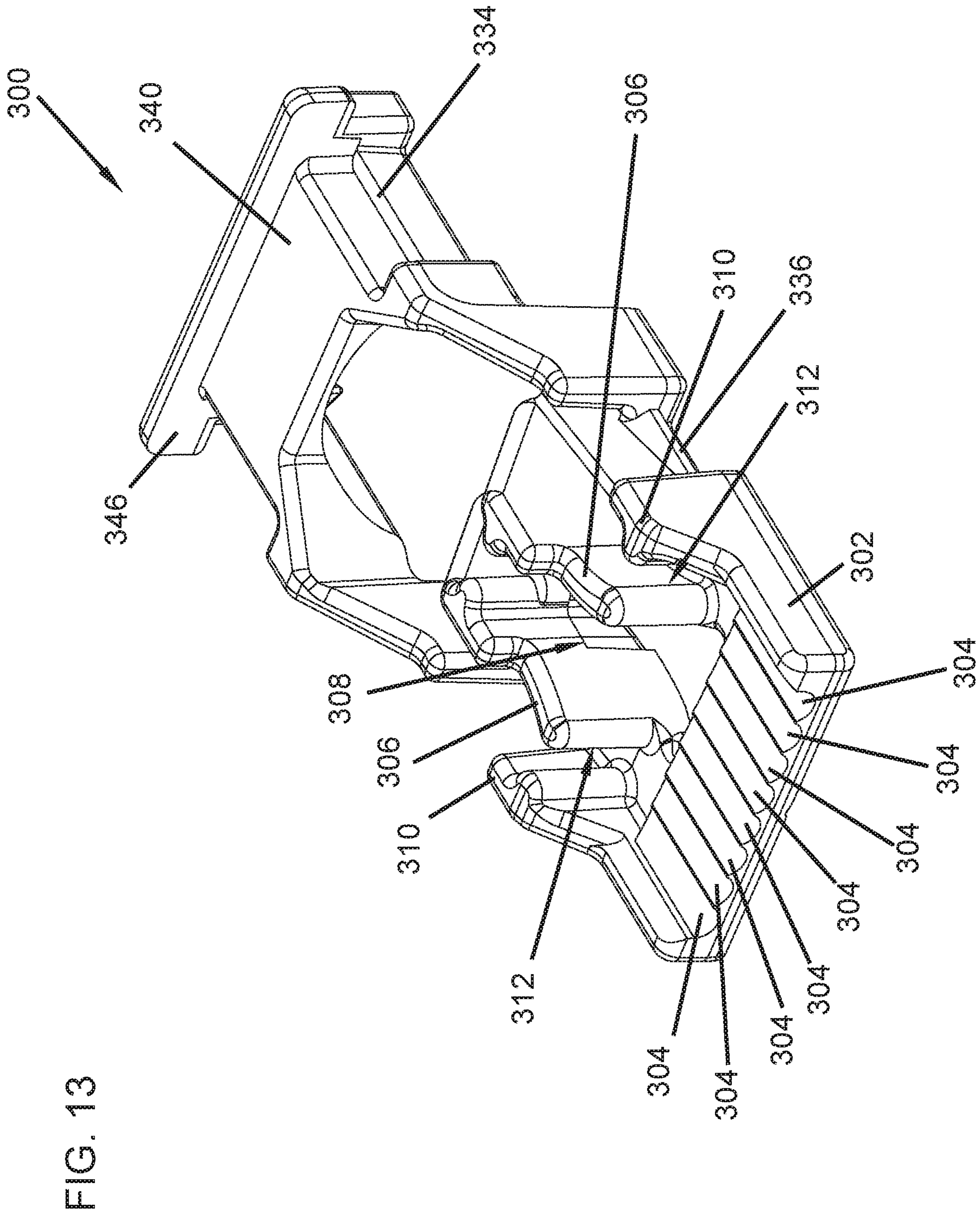
FIG. 13 is a perspective view of a wire manager.

FIG. 12 is a perspective view of the modular plug with the housing 200 removed. Referring now to FIG. 12, the strain relief member 400 is structured to snap fit onto the wire manager 300, and the hood 500 is structured to snap fit onto the wire manager 300. As described above, the tabs 402 of the strain relief member 400 are received in the slots 214 of the housing 200 to secure the wire manager 300, strain relief member 400, and hood 500 in the internal cavity 216 of the housing 200.

FIGS. 13-18 are perspective, top, bottom, side, front, and rear views, respectively, of the wire manager 300. Referring now to FIGS. 13-18, the wire manager 300 includes a load bar 302. The load bar 302 extends from the wire manager 300 and defines an array of grooves 304. The wire manager 300 receives pairs of twisted wires from the telecommunications cable 10 through a rear portion 340 of the wire manager 300. The pairs of twisted wires are managed by the wire manager 300 by inserting them through a central channel 308 and through side channels 312. Each groove 304 is shaped and sized to receive a single wire from the pairs of twisted wires.

In the example shown, the grooves 304 are parallel and are arranged in the same vertical plane. In an alternative example, the grooves 304 are vertically offset where, for example, a first row of grooves is positioned in a first vertical plane and a second row of grooves is positioned in a second vertical plane, and where the first vertical plane is different from the second vertical plane. Other configurations for the load bar 302 are possible.

The grooves 304 align each wire from the pairs of twisted wires with a wire contact 110 (see FIGS. 9 and 12) held by the housing 200. Each groove 304 is exposed (e.g., uncovered) on the load bar 302 so that a crimping tool is used to crimp the wire contacts 110 into the wires positioned by the grooves 304. After assembly, each wire contact 110 can electrically connect each wire from the pairs of twisted wires to a contact spring of a telecommunications jack.

The wire manager 300 includes internal walls 306 that define the central channel 308, and outer walls 310 that define together with the internal walls 306, the side channels 312 on opposite sides of the central channel 308. The internal walls 306 and outer walls 310 are flexible such that the internal walls 306 and outer walls 310 are flexible in opposite directions D1 and D2 that are orthogonal with respect to a long axis AA of the wire manager 300 (See FIG. 14).

Figure 14:
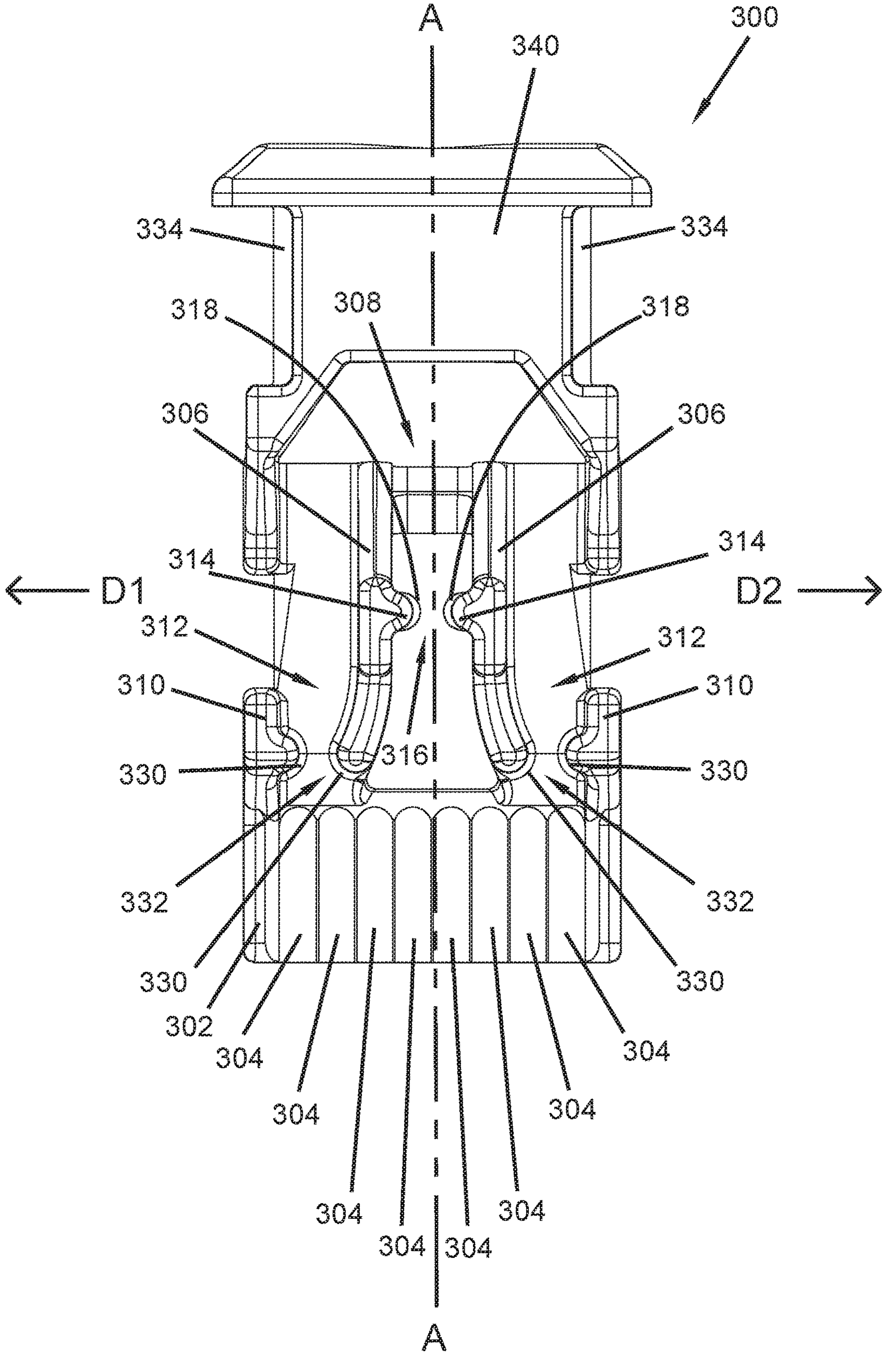
FIG. 14 is a top view of the wire manager.
Figure 15:
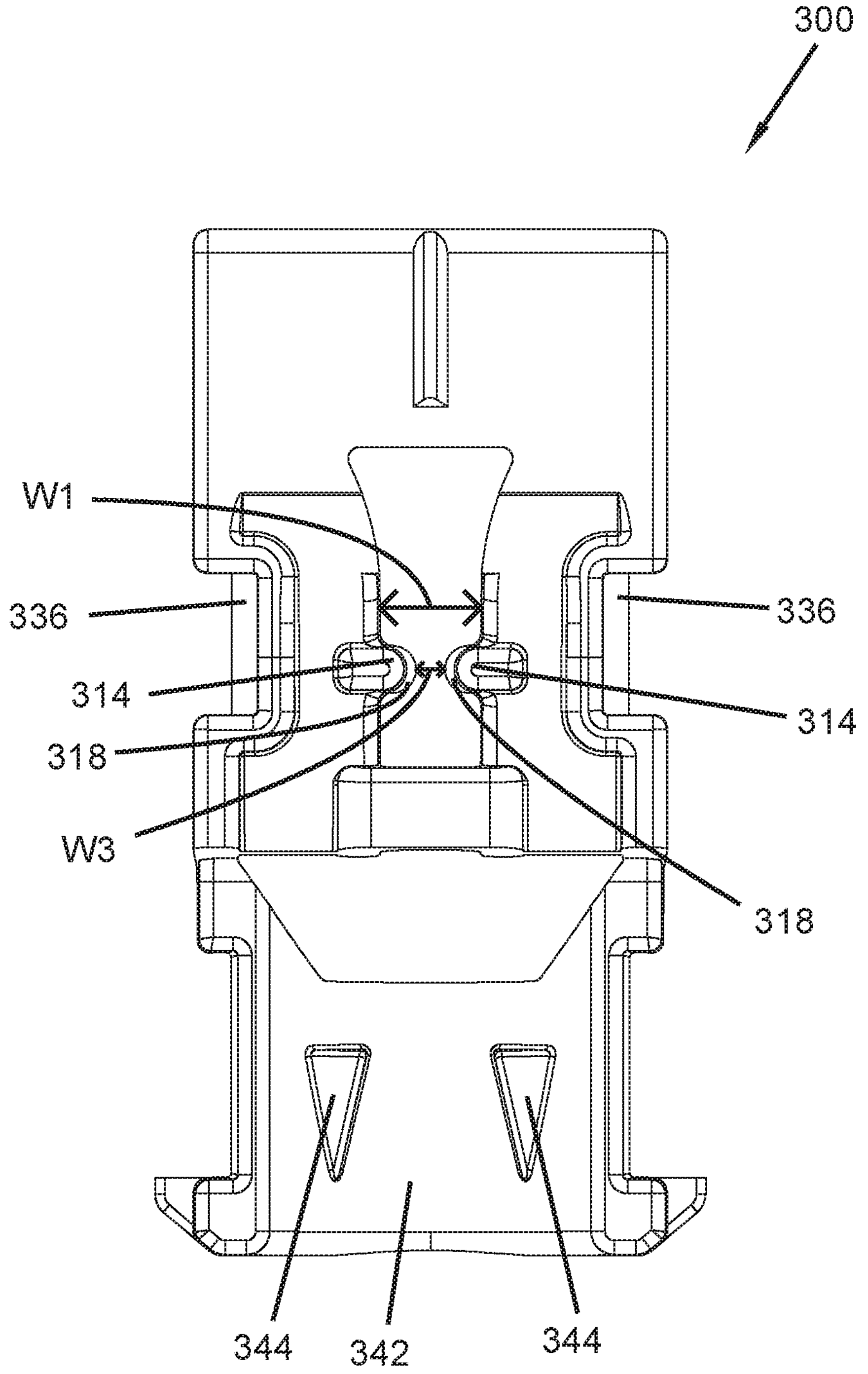
FIG. 15 is a bottom view of the wire manager.
Figure 16:
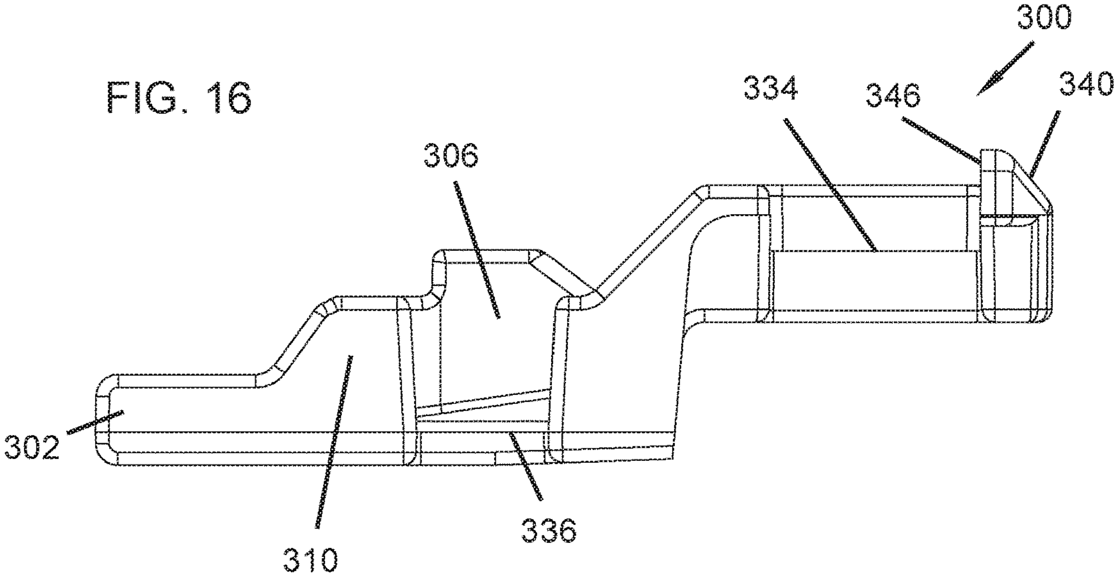
FIG. 16 is a side view of the wire manager.
Figure 17:
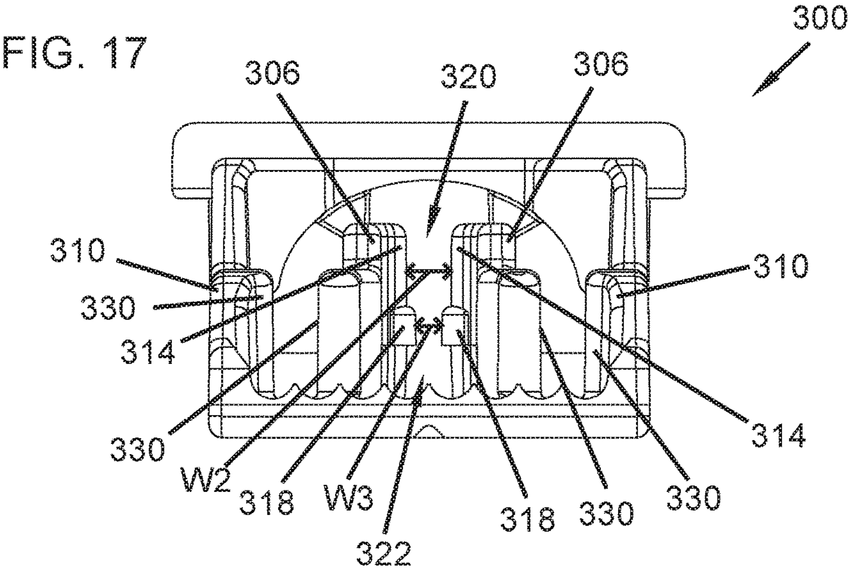
FIG. 17 is a front view of the wire manager.
Figure 18:
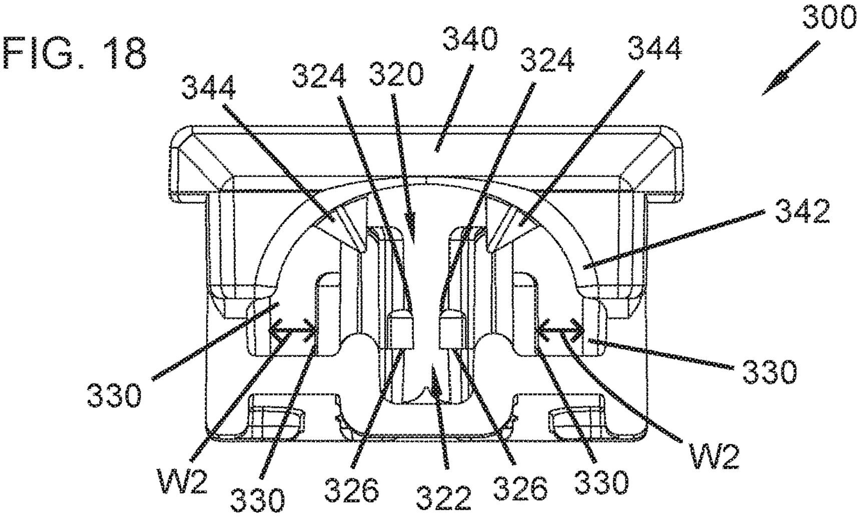
FIG. 18 is a rear view of the wire manager.
Figure 19:
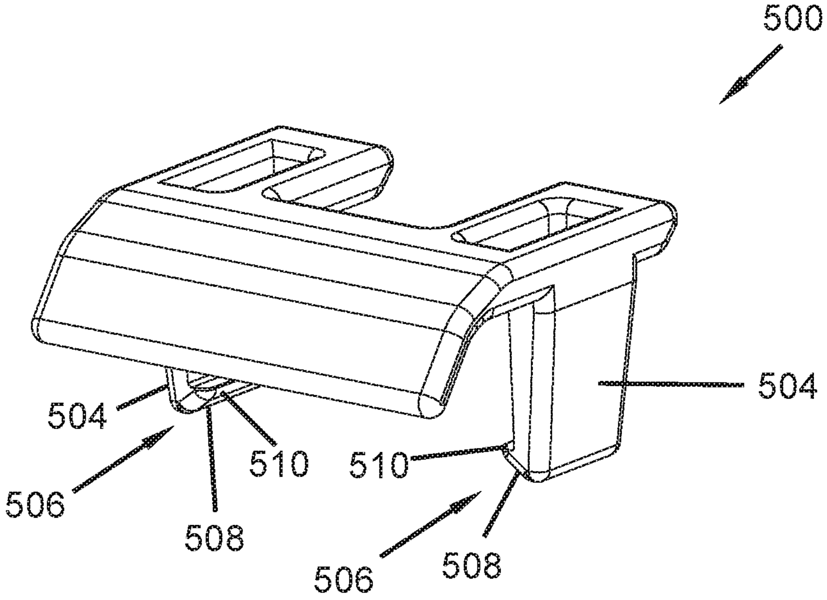
FIG. 19 is a perspective view of a hood.
Figure 20:
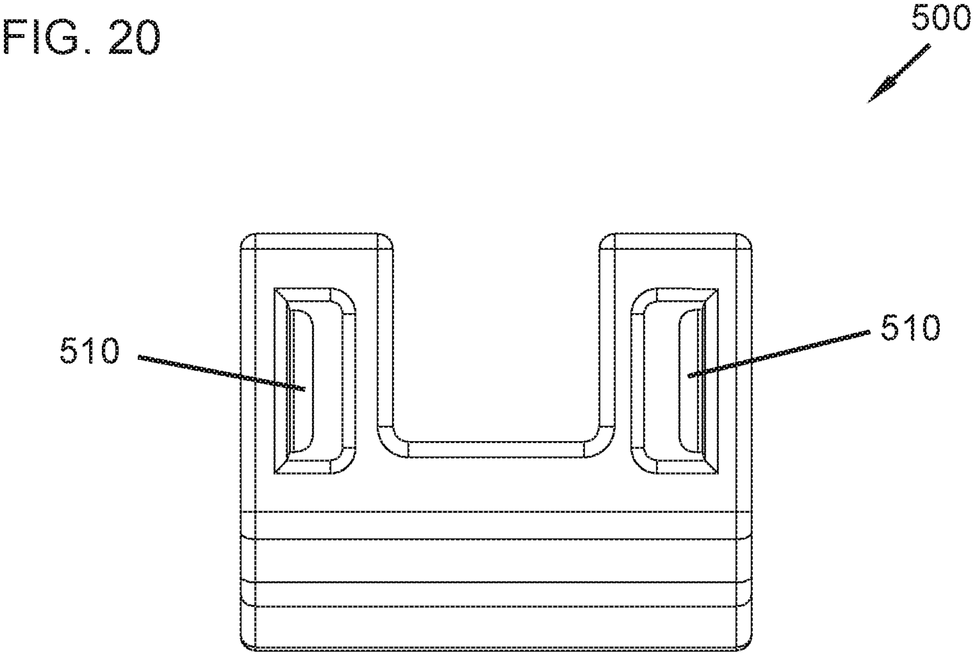
FIG. 20 is a top view of the hood.
Figure 21:
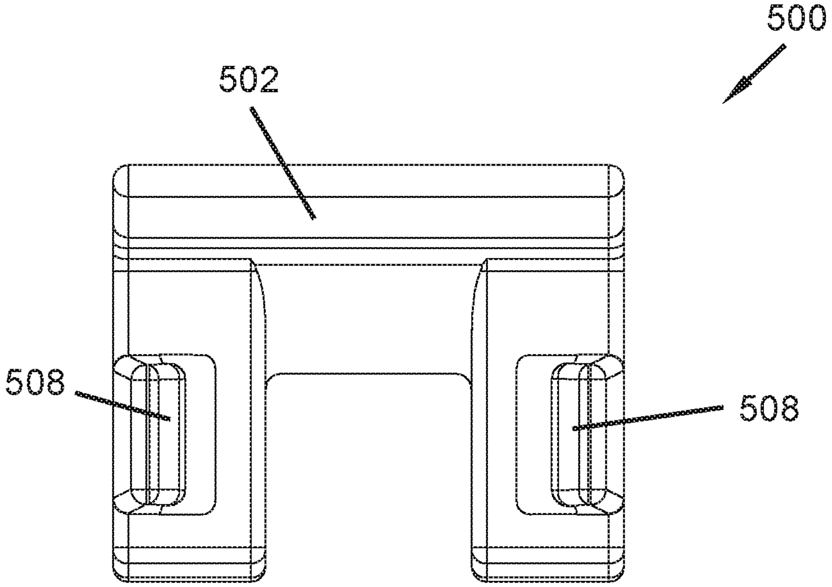
FIG. 21 is a bottom view of the hood.
Figure 22:
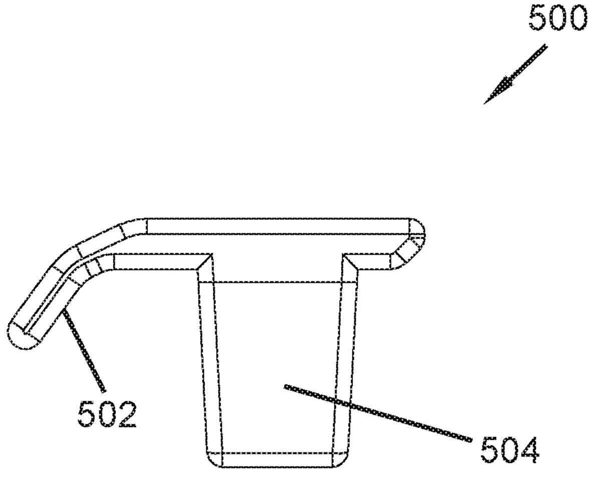
FIG. 22 is a side view of the hood.
Figure 23:
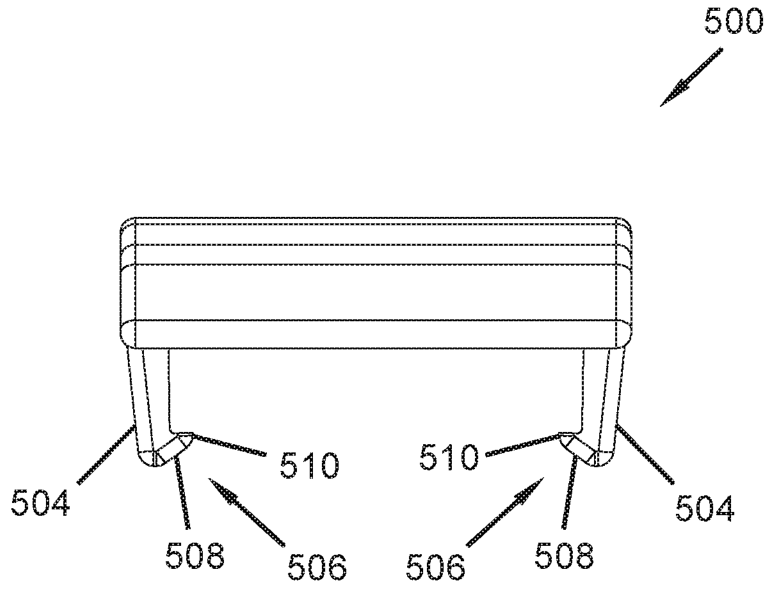
FIG. 23 is a front view of the hood.
Figure 24:
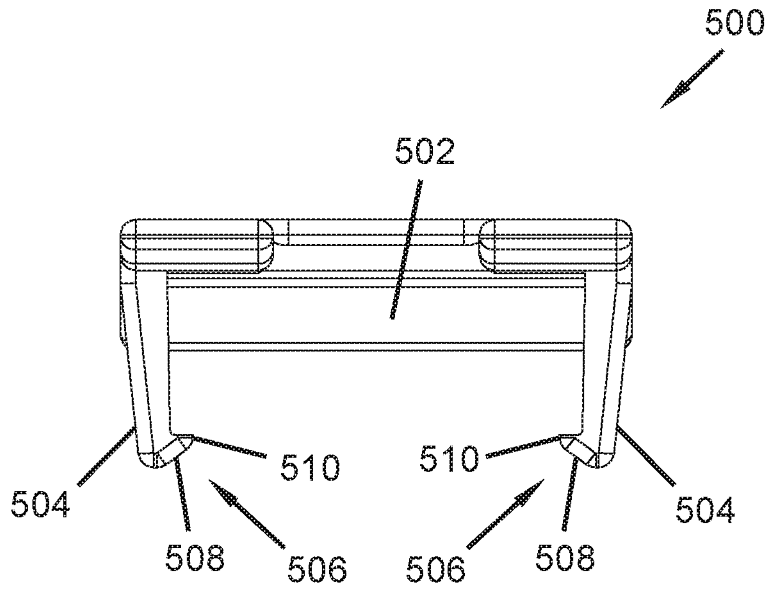
FIG. 24 is a rear view of the hood.
Figure 25:
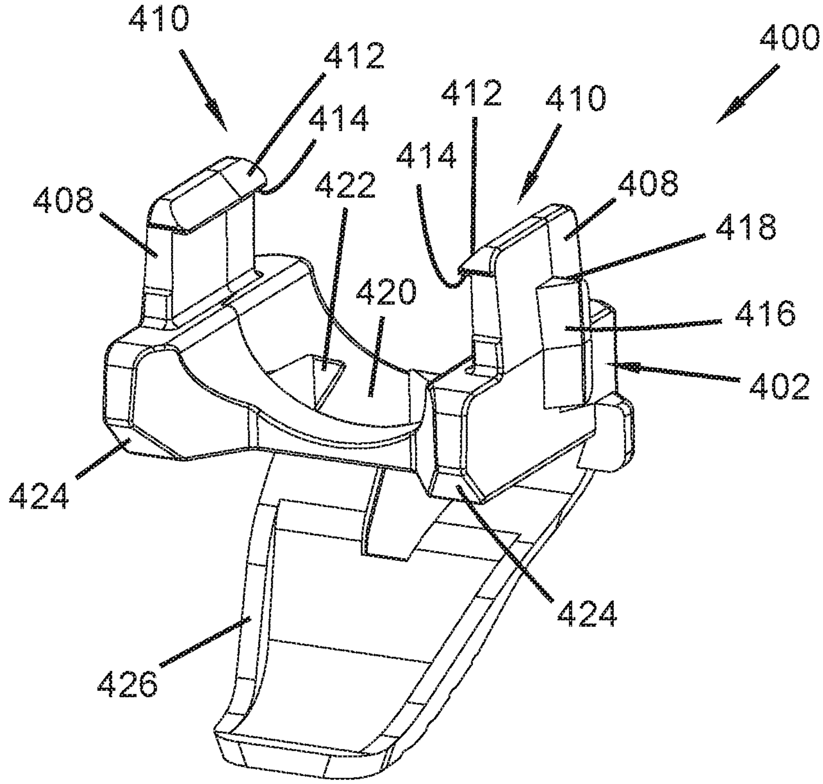
FIG. 25 is a perspective view of a strain relief member.
Figure 26:
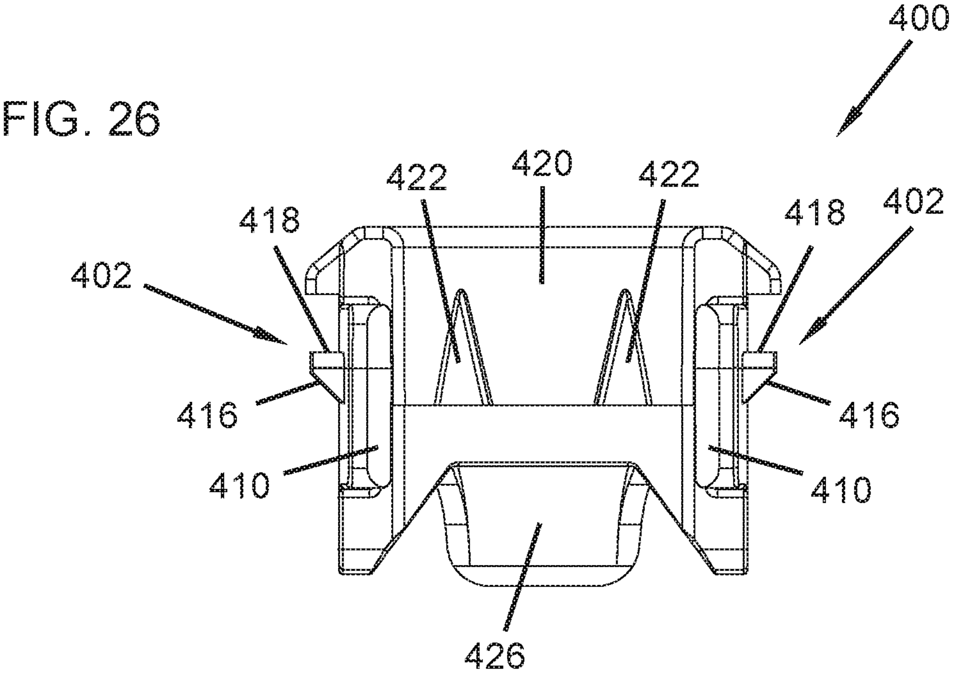
FIG. 26 is a top view of the strain relief member.
Figure 27:
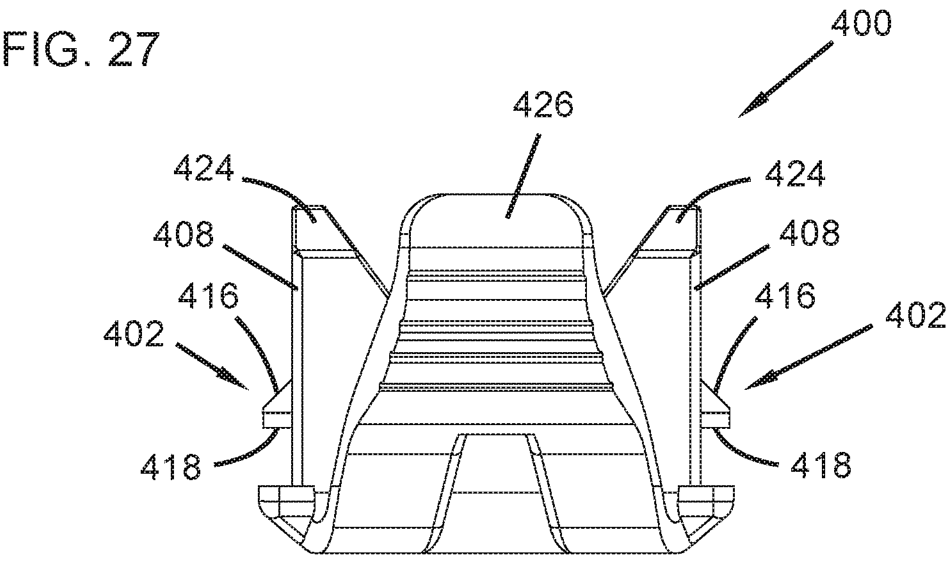
FIG. 27 is a bottom view of the strain relief member.
Figure 28:
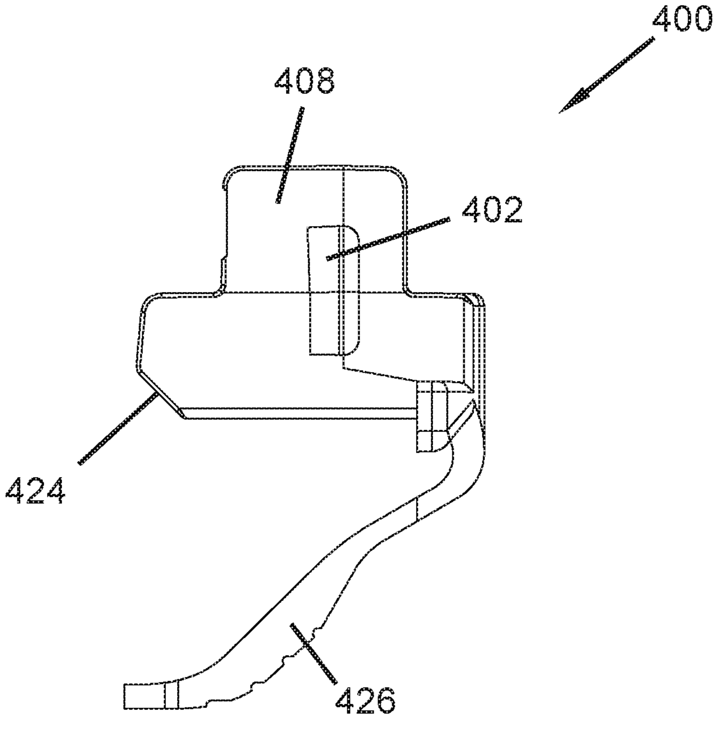
FIG. 28 is a side view of the strain relief member.
Figure 29:
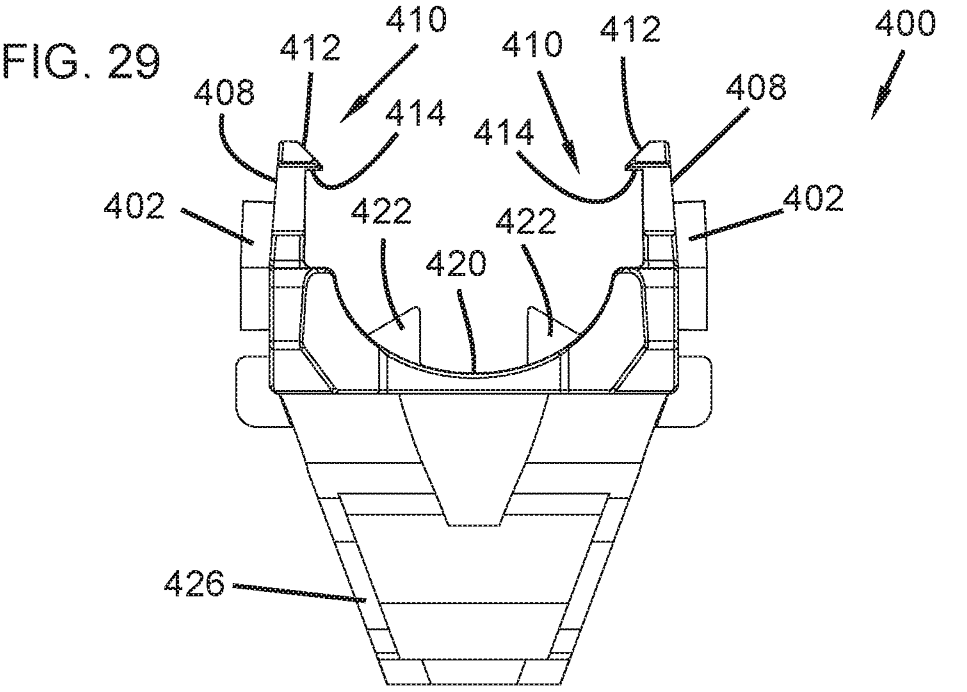
FIG. 29 is a front view of the strain relief member.
Figure 30:
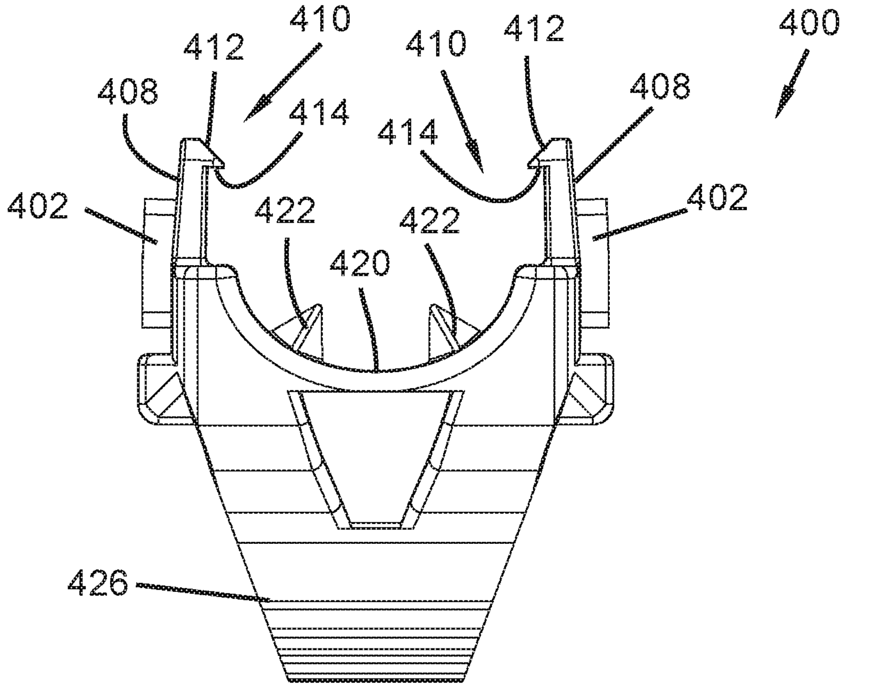
FIG. 30 is a rear view of the strain relief member.

Referring now to FIGS. 14, 17, and 18, opposing edges 314 on the internal walls 306 define a gate 316 in the central channel 308. The gate 316 decreases the width of the central channel 308 from a first width W1 to a second width W2. The gate 316 includes a separator feature that contains a first pair of twisted wires in the lower portion of the gate. In certain embodiments, the separator feature includes tabs 318 that project from the opposing edges 314 of the gate 316. The tabs 318 further decrease the second width W2 between the opposing edges 314 to a third width W3. As shown in FIGS. 17 and 18, the tabs 318 define an upper portion 320 and a lower portion 322 in the gate 316.

The second width W2 of the gate 316 is less than twice the diameter of a single wire from each pair of twisted wires. In some examples, the second width W2 of the gate 316 is equal to or less than the diameter of a single wire. The gate 316 is structured to position a pair of twisted wires such that the pairs of twisted wires are only able to pass through the gate 316 in a stacked arrangement. In one example, the gate 316 is sized and shaped to engage a pair of twisted wires on both sides of the wires to hold the pair of twisted wires in a stacked vertical arrangement.

Advantageously, the gate 316 maintains the twist and spacing between the pairs of twisted wires before the wires reach the load bar 302. By maintaining the twist and spacing, the wire manager 300 substantially reduces variability in crosstalk between the wires inside the modular plug 100, and thus substantially improves the performance of the modular plug 100. Additionally, the gate 316 holds the pairs of twisted wires making it easier for a technician to untwist the wires.

The third width W3 defines the smallest dimension of the central channel 308. The third width W3 is less than the diameter of a single wire from each pair of twisted wires such that terminating the telecommunications cable 10 by the modular plug 100 includes pressing the individual wires from a first pair of twisted wires beyond the tabs 318 and into the lower portion 322 of the gate 316. The internal walls 306 are structured to flex in opposite directions to allow the first pair of twisted wires to be pressed beyond the tabs 318 and into the lower portion 322.

Each tab 318 has an upper edge 324 that is rounded to help a technician press the wires from the first pair of twisted wires beyond the tabs 318. Each tab 318 also has a lower edge 326 that is substantially planar to help maintain the first pair of twisted wires in the lower portion 322 of the gate 316 once the wires have been pressed beyond the tabs 318.

A second pair of twisted wires is positioned in the upper portion 320 of the gate 316. As shown in FIG. 14, the internal walls 306 diverge in opposite directions to guide the wires from the first and second pairs of twisted wires held by the gate 316 to the load bar 302.

The wire manager 300 further includes opposing edges 330 between the internal walls 306 and outer walls 310 that define gates 332 in the side channels 312. The internal walls 306 curve in opposite directions towards the outer walls 310 to at least partially define the gates 332 in the side channels 312. The gates 332 in the side channels 312 are offset with respect to the gate 316 in the central channel 308 on the long axis AA of the wire manager 300. For example, the gates 332 are in closer proximity to the load bar 302 than the gate 316. The gates 332 in the side channels 312 each position a third and a fourth pair of twisted wires.

The gates 332 decrease the width of the side channels 312 to the second width W2. As described above, the second width W2 is less than twice the diameter of a single wire from each pair of twisted wires, and in some examples, the second width W2 is equal to or less than the diameter of a single wire. The gates 332 position the third and fourth pairs of twisted wires such that the wires are only able to pass through the gates 332 in a stacked arrangement. In some examples, the gates 332 are sized and shaped to engage the third and fourth pairs of twisted wires on both sides of each twisted pair to hold the wires in a stacked vertical arrangement.

The gates 332 maintain the twist and spacing of the third and fourth pairs of twisted wires before the wires reach the load bar 302 to substantially reduce variability in crosstalk between the wires inside the modular plug 100, and thus substantially improves the performance of the modular plug 100. Additionally, the gates 332 hold the third and fourth pairs of twisted wires making it easier for a technician to untwist the wires.

Referring now to FIG. 18, the rear portion 340 of the wire manager 300 includes a planar surface 346 that abuts the rear portion 204 of the housing 200 when wire manager 300 is housed inside the opening 212 of the housing 200. The rear portion 340 defines an interior surface 342 that partially fits around the jacket of the telecommunications cable 10. For example, the interior surface 342 has a concave shape that fits around a circular jacket of the cable. The interior surface 342 may have other shapes to accommodate differently shaped cables.

The interior surface 342 includes ribs 344 each having a sloped surface. The ribs 344 are configured to grip the outer protective jacket of the telecommunications cable 10 when the strain relief member 400 is at least partially attached to the wire manager 300.

Referring now to FIGS. 12, 13, 14, and 16, the wire manager 300 includes edges 334 that receive a catch 410 the strain relief member 400. The wire manager 300 also includes edges 336 that receive a catch 506 of the hood 500.

FIGS. 19-24 are perspective, top, bottom, side, front, and rear views of the hood 500. Referring now to FIGS. 12 and 19-24, the hood 500 restrains the pairs of twisted wires onto the load bar 302. For example, the hood 500 has an internal surface 502 that covers and presses down on the pairs of twisted wires when the hood 500 is attached to the wire manager 300.

The hood 500 includes sides 504 each having a catch 506. The sides 504 are flexible such that they are structured to flex around the wire manager 300. Each catch 506 has a declined lower surface 508 and an orthogonal upper surface 510. The catches 506 are structured to snap fit the hood 500 onto the edges 336 of the wire manager 300.

FIGS. 25-30 are perspective, top, bottom, side, front, and rear views respectively of the strain relief member 400. Referring now to FIGS. 12 and 25-30, the strain relief member 400 includes sides 408 each having a catch 410. The sides 408 are flexible such that they are structured to flex around the wire manager 300. Each catch 410 has a declined upper surface 412 and an orthogonal lower surface 414. The catches 410 are structured to snap fit the strain relief member 400 onto the edges 334 of the wire manager 300.

Each side 408 of the strain relief member 400 further includes a tab 402 having a forward declined surface 416 and a rearward orthogonal surface 418. As described above (see FIGS. 1 and 2), the tabs 402 snap fit into the slots 214 of the housing 200.

The strain relief member 400 includes an interior surface 420 that corresponds to the interior surface 342 of the wire manager 300. For example, the interior surface 420 has a concave shape that matches the concave shape of the interior surface 342 of the wire manager 300 such that when the strain relief member 400 is attached to the wire manager 300, the interior surfaces 342, 420 surround the protective outer jacket of the telecommunications cable 10.

Additionally, the interior surface 420 includes ribs 422 each having a sloped surface. The ribs 422 are configured to grip the protective outer jacket of the telecommunications cable 10 when the strain relief member 400 is at least partially attached to the wire manager 300.

The strain relief member 400 has an arm 426 that receives a distal end of the latching handle 206 of the housing 200. In these examples, the arm 426 prevents the latching handle 206 from being snagged with other components and thus provides an anti-snag functionality. The arm 426 may also function as an actuator for the latching handle 206 by transmitting pressure asserted onto the arm 426 to actuate the latching handle 206 to insert or remove the modular plug 100 from a telecommunications jack. Thus, the difficulty of actuating the latching handle 206 due to the relatively small size of the modular plug 100 is reduced or eliminated by the arm 426. In some examples, the strain relief member 400 does not include the arm 426.

Figure 31:
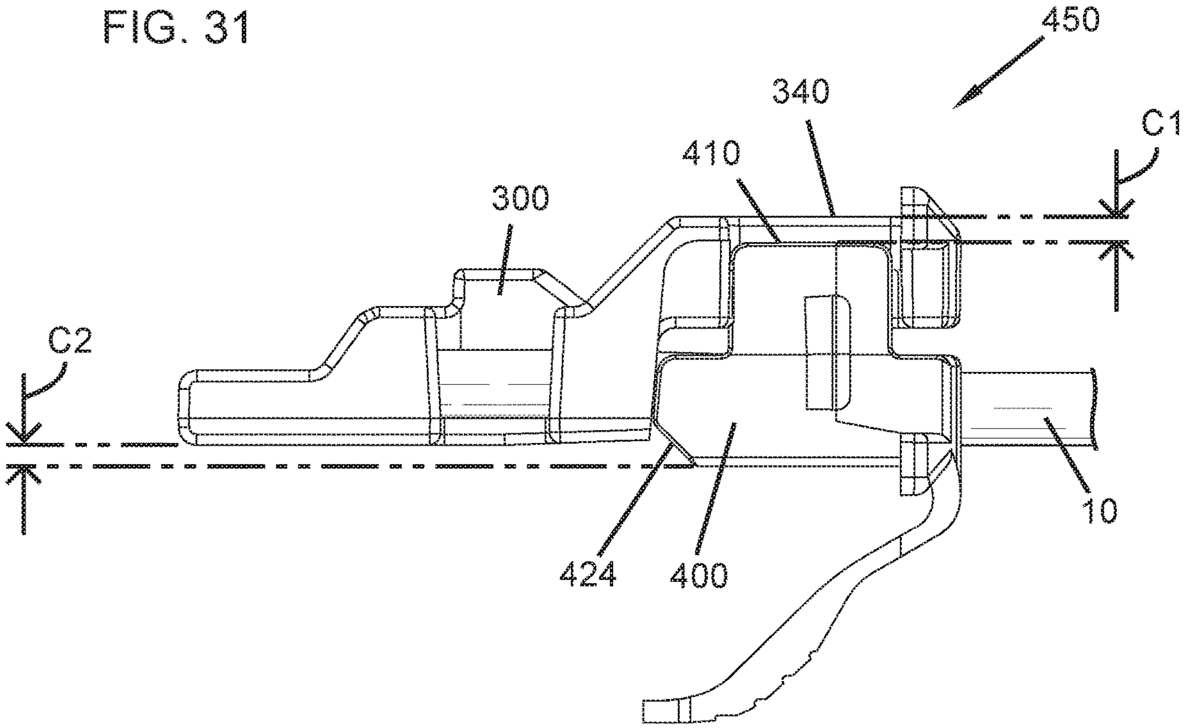
FIG. 31 is a side view of the strain relief member attached to the wire manager in an intermediate position with a telecommunications cable partially restrained.

FIG. 31 is a side view of the strain relief member 400 attached to the wire manager 300 in an intermediate position 450. In the intermediate position 450, the strain relief member 400 and wire manager 300 partially restrain the telecommunications cable 10 relative to the wire manager 300. In the intermediate position 450, the catches 410 are latched onto the edges 334 of the wire manager 300 such that the orthogonal lower surfaces 414 abut the edges 334, and a clearance C1 exists between the catches 410 and the rear portion 340 of the wire manager 300. Also, a clearance C2 exists between a bottom portion of the strain relief member 400 and a bottom portion of the wire manager 300. In some example embodiments, the clearance C2 is substantially similar or is equal to the clearance C1.

In the intermediate position 450, the telecommunications cable 10 is not completely restrained such that the cable can twist (i.e., radial movement) or slide (i.e., axial movement) relative to the wire manager 300 to allow the pairs of twisted wires to be positioned through the central channel 308 and side channels 312, and to allow the pairs of twisted wires to be positioned through the gates 316, 332 before reaching the load bar 302.

The strain relief member 400 includes an angled surface 424 that engages the rear portion 204 of the housing 200 when the wire manager 300 and strain relief member 400 are inserted into the internal cavity 216 of the housing 200. The angled surface 424 positions the strain relief member 400 inside the internal cavity 216 such that the tabs 402 are received by the slots 214 of the housing 200, and the clearances C1 and C2 are substantially reduced or eliminated such that the catches 410 and the rear portion 340 are substantially flush with one another and also the bottom portion of the strain relief member 400 and the bottom portion of the wire manager 300 are substantially flush with one another when the wire manager 300 and strain relief member 400 are housed inside the internal cavity 216 of the housing 200.

Advantageously, the intermediate position 450 partially restrains the telecommunications cable 10 relative to the wire manager 300 to improve the handling of the telecommunications cable 10 and the modular plug 100 while allowing for some movement between the telecommunications cable 10 and the wire manager 300. The intermediate position 450 can simplify and make easier the installation of the modular plug 100 onto the telecommunications cable 10 while in the field.

Figure 32:
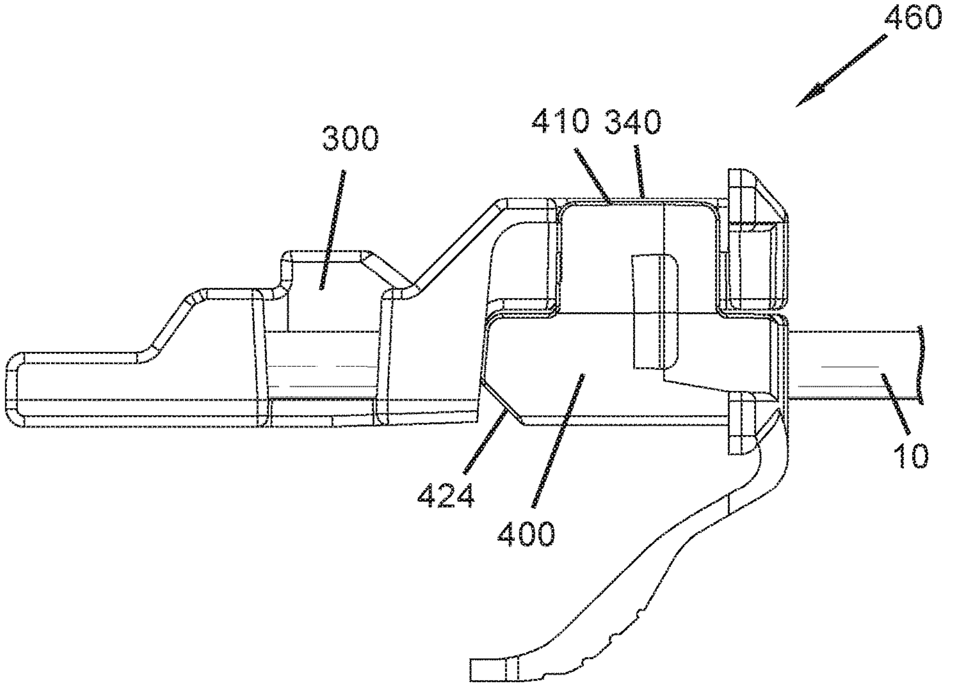
FIG. 32 is a side view of the strain relief member attached to the wire manager in a final position with a telecommunications cable fully restrained.

FIG. 32 is a side view of the strain relief member 400 attached to the wire manager 300 in a final position 460. In the final position 460, the telecommunications cable 10 is completely restrained by the strain relief member 400 and wire manager 300. For example, the ribs 344 of the wire manager 300 and the ribs 422 of the strain relief member 400 engage the jacket of the telecommunications cable 10 to restrain the telecommunications cable 10. In the final position 460, the clearances C1 and C2 are substantially reduced or eliminated.

Figure 33:
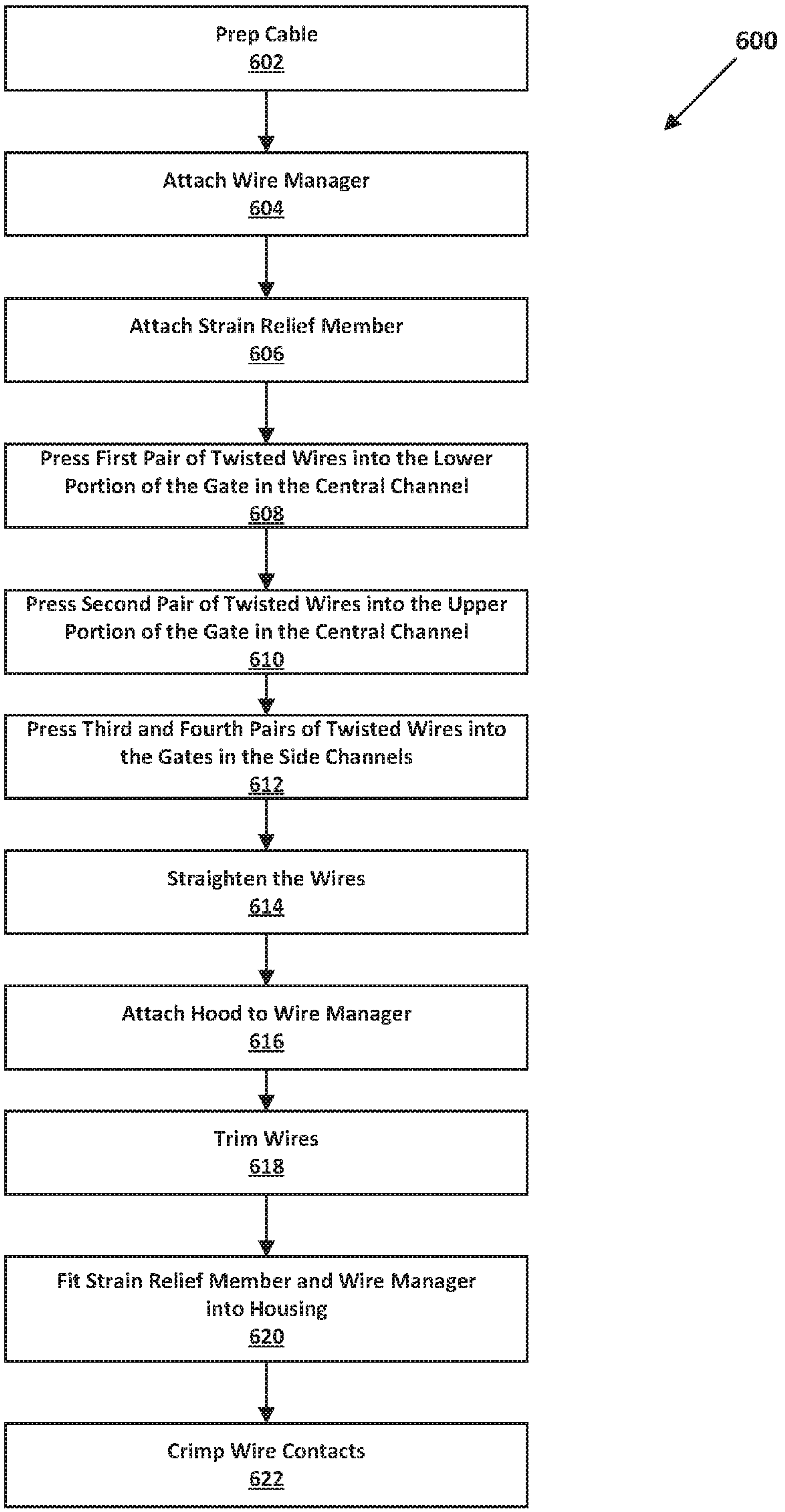
FIG. 33 illustrates a method of terminating the telecommunications cable using the modular plug of FIGS. 1-32.

FIG. 33 illustrates a method 600 of terminating the telecommunications cable 10 with the modular plug 100. The method 600 includes a step 602 of preparing the telecommunications cable 10. The step 602 can include removing or stripping a portion of the protective outer jacket at the terminal end of the telecommunications cable 10 to expose the pairs of twisted wires. The step 602 may also include removing one or more internal protective layers (e.g., cross dividers, pair dividers, etc.), and breaking out the pairs of twisted wires at the terminal end of the cable.

Next, the method 600 includes a step 604 of attaching the wire manager 300 to the terminal end of the telecommunications cable 10. The step 604 can include pushing the pairs of twisted wires through the rear portion 340 of the wire manager 300, and fitting the interior surface 342 around the protective outer jacket of the telecommunications cable 10.

Next, the method 600 includes a step 606 of attaching the strain relief member 400 to the wire manager 300 in the intermediate position 450. As described above, the intermediate position 450 partially restrains the telecommunications cable 10 relative to the wire manager 300 such that the telecommunications cable 10 is not completely restrained which allows the telecommunications cable 10 to twist (i.e., radial movement) or slide (i.e., axial movement) relative to the wire manager 300. This allows a technician to position the pairs of twisted wires through the channels 308, 312 of the wire manager 300, and to position the pairs of twisted wires through the gates 316, 332 before reaching the load bar 302.

Next, the method 600 includes a step 608 of pressing a first pair of twisted wires in the central channel 308 beyond the tabs 318 and into the lower portion 322 of the gate 316. As described above, the internal walls 306 are structured to flex in opposite directions to allow the first pair of twisted wires to be pressed beyond the tabs 318 and into the lower portion 322.

Figure 34:
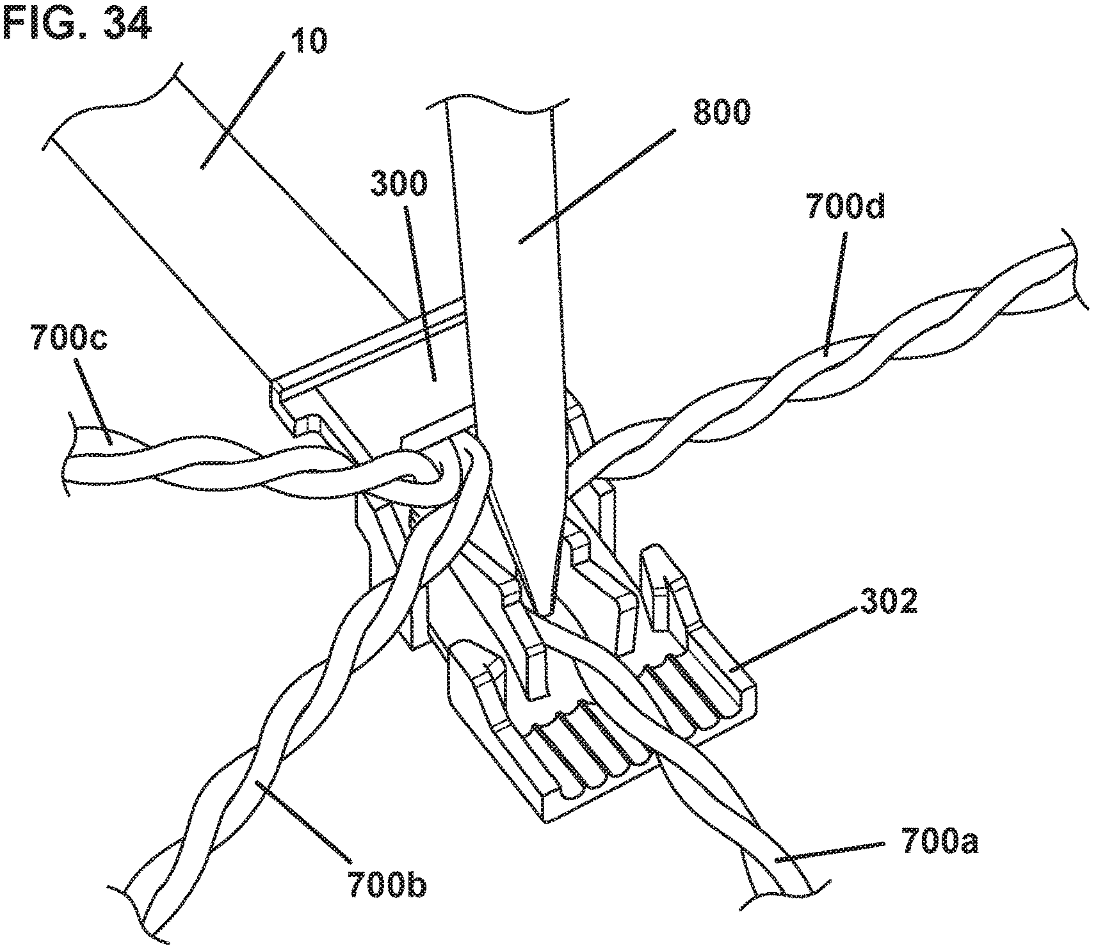
FIG. 34 is an isometric view of the first pair of twisted wires pressed into the lower portion of the gate in the central channel.

FIG. 34 is an isometric view of the first pair of twisted wires 700*a* pressed into the lower portion 322 of the gate 316 in the central channel. As shown in FIG. 34, the telecommunications cable 10 includes a first pair, a second pair, a third pair, and a fourth pair of twisted wires 700*a*, 700*b*, 700*c*, and 700*d*. As shown in FIG. 34, step 608 can include using a tool 800 such as a screwdriver to push the first pair of twisted wires 700*a* through the gate.

In some examples, step 608 (i.e., pressing the first pair of twisted wires 700*a* through the gate in the central channel of the wire manager) is performed before step 606 (i.e., attaching the strain relief member 400 to the wire manager 300 in the intermediate position 450). FIG. 34 shows the first pair of twisted wires 700*a* pressed through the gate in the central channel of the wire manager 300 before the strain relief member 400 has been attached to the wire manager 300. In other examples, step 606 (i.e., attaching the strain relief member 400 to the wire manager 300 in the intermediate position 450) is performed before step 608 (i.e., pressing the first pair of twisted wires 700*a* through the gate in the central channel of the wire manager).

Figure 35:
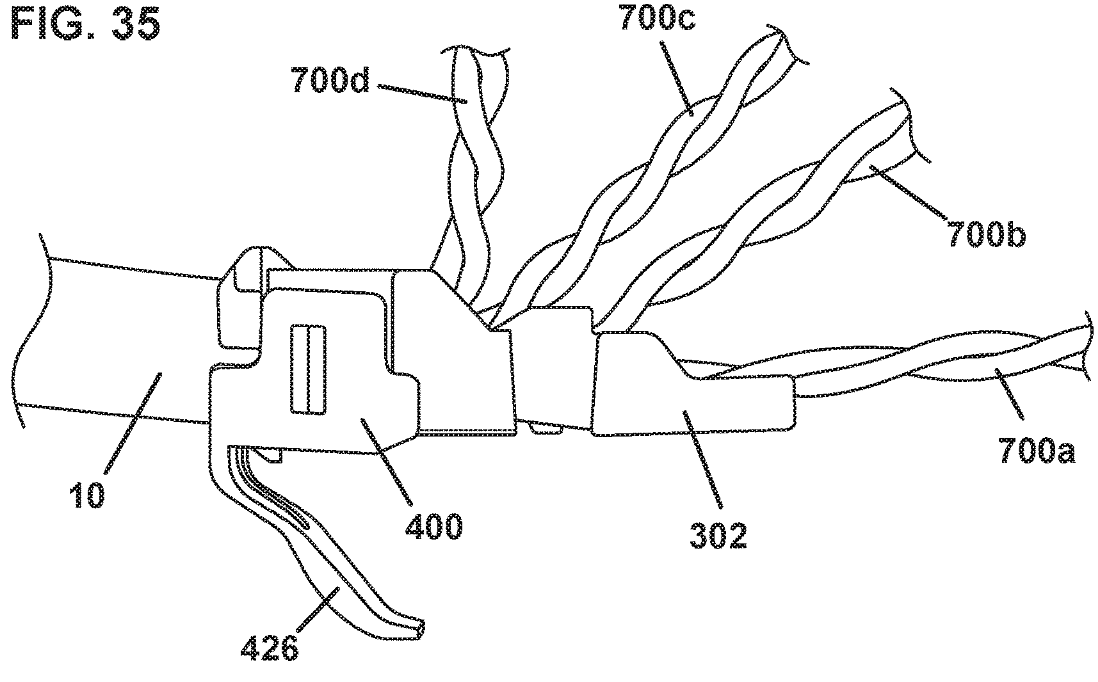
FIG. 35 is a side view of the strain relief member attached to the wire manager.

FIG. 35 shows a side view of the strain relief member 400 attached to the wire manager 300, and the first pair of twisted wires 700*a* pushed through the gate 316 in the central channel 308 of the wire manager 300. As shown in FIGS. 34 and 35, after being pushed through the gate 316, the first pair of twisted wires 700*a* extends beyond the load bar 302.

Figure 36:
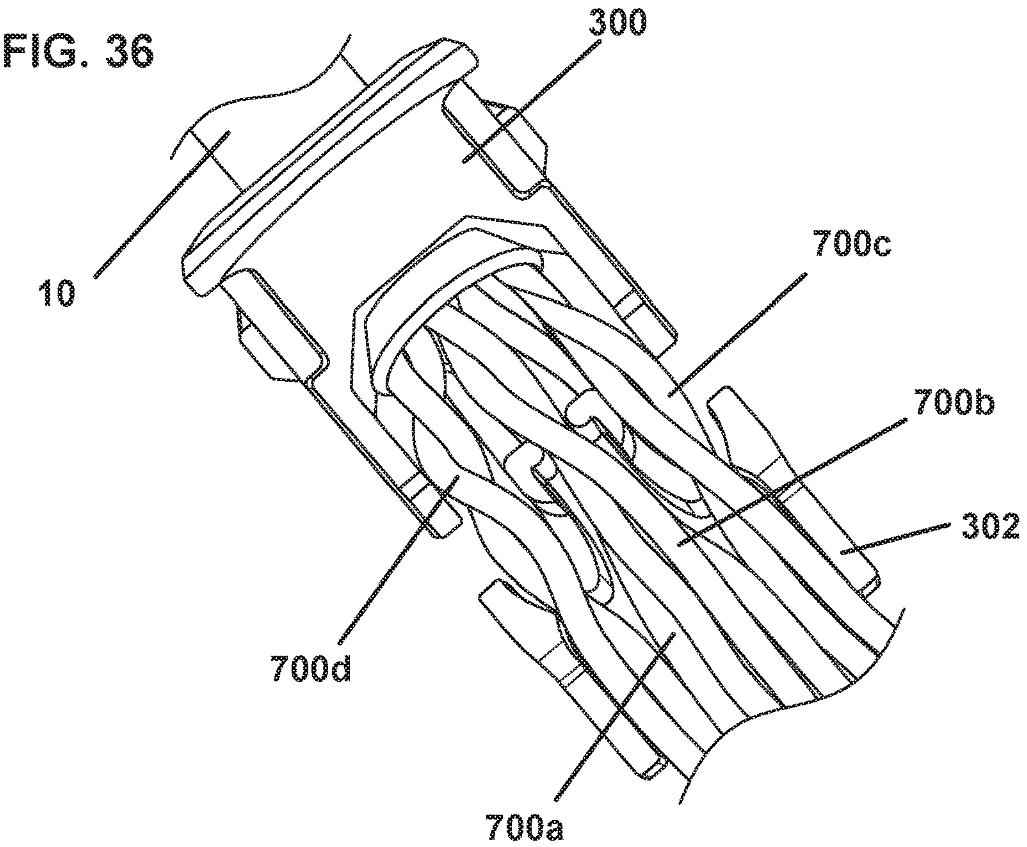
FIG. 36 is a top view of the first, second, third, and fourth pairs of twisted wires from the telecommunications cable each pressed into the gates of the wire manager.

Next, the method 600 includes a step 610 of pressing the second pair of twisted wires 700*b* in the central channel 308 and into the upper portion 320 of the gate 316, followed by a step 612 pressing the third pair of twisted wires 700*c* into a gate 332 of a side channel 312 and pressing the fourth pair of twisted wires 700*d* into a gate 332 of an opposite side channel 312. FIG. 36 shows the wire manager 300 after completion of step 612 where the first pair, second pair, third pair, and fourth pair of twisted wires 700*a*, 700*b*, 700*c*, and 700*d* are each pushed through the gates 316, 332 in the channels 308, 312 of the wire manager 300.

In some examples, the method 600 includes a step 614 of straightening the first pair, second pair, third pair, and fourth pair of twisted wires 700*a*, 700*b*, 700*c*, and 700*d* after they have been pushed through the gates 316, 332 in the channels 308, 312 of the wire manager 300. See, for example, FIG. 36 which shows the pairs of twisted wires after they have been straightened on the load bar 302. In some examples, a tool can be used to straighten the pairs of twisted wires after the wires exit the gates 316, 332. In some examples, the tool is a JacKnack tool or similar type of tool. As described above, the gates 316, 332 hold the pairs of twisted wires making it easier for a technician to untwist the wires after the wires exit the gates 316, 332.

Figure 37:
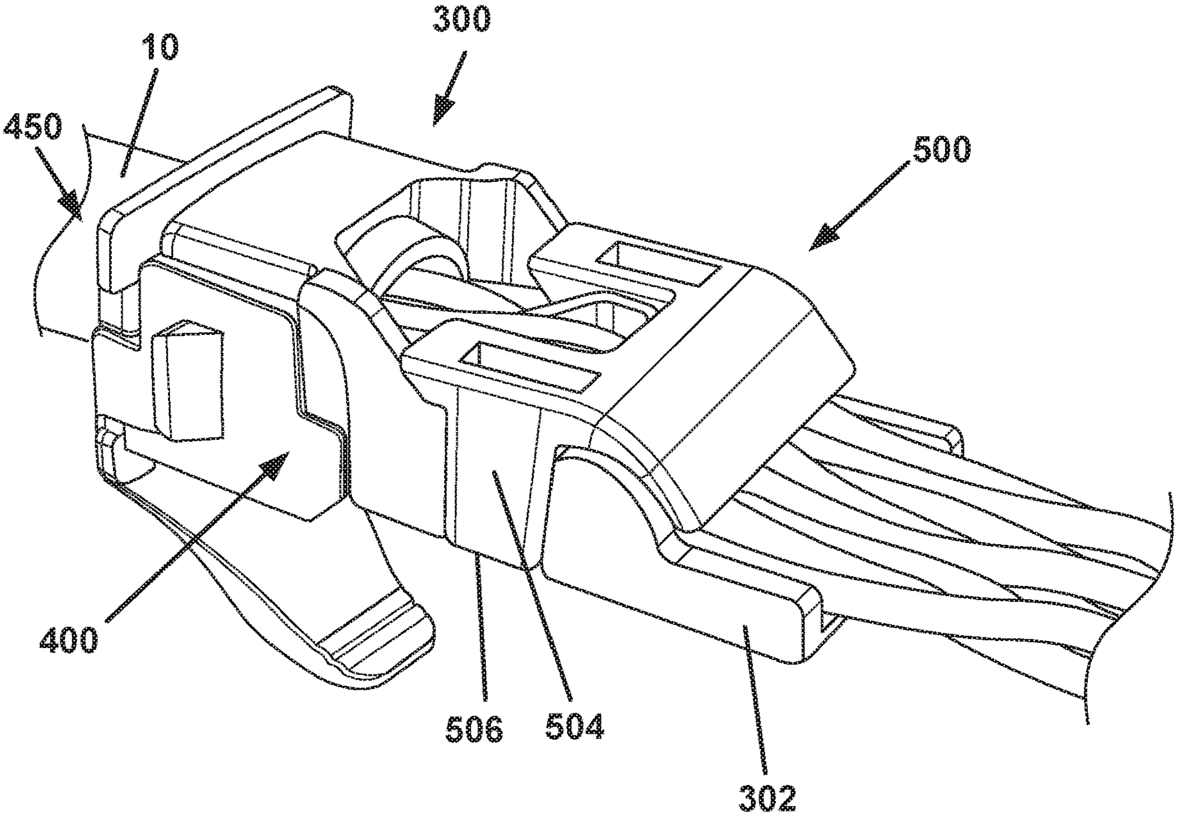
FIG. 37 shows the cover attached to the wire manager.

FIGS. 36 and 37 show the straightened wires exiting the gates 316, 332 of the wire manager 300. As shown in these figures, the offset of the gate 316 in the central channel 308 with respect to the gates 332 in the side channels 312 provides space for the first pair of twisted wires 700*a* to go around the second pair of twisted wires 700*b*.

Next, the method 600 includes a step 616 of attaching the hood 500 to the wire manager 300. FIG. 37 shows the hood 500 attached to the wire manager 300 after completion of step 616. As described above, the hood 500 restrains the pairs of twisted wires 700*a*, 700*b*, 700*c*, 700*d* onto the load bar 302. Furthermore, the catches 506 snap fit onto the wire manager 300.

Figure 38:
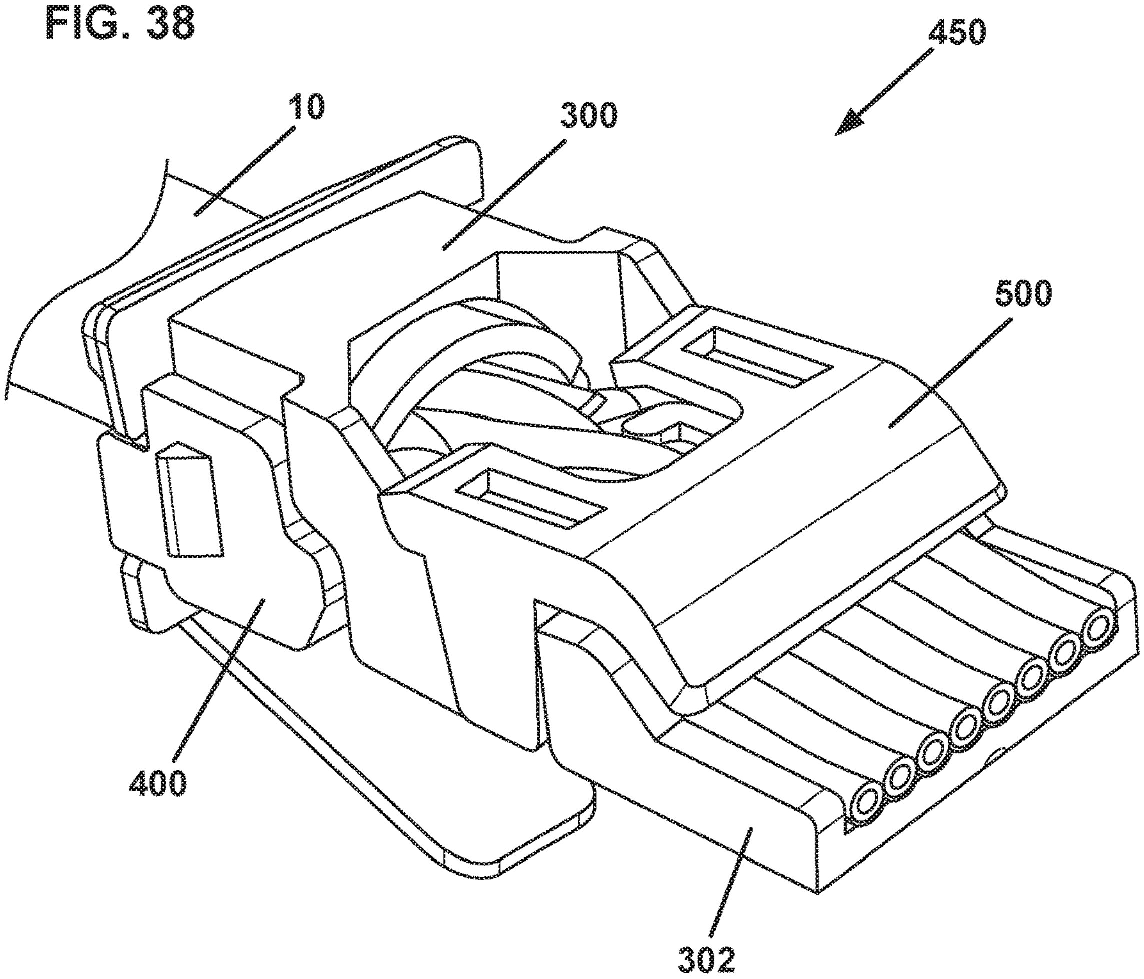
FIG. 38 shows the pairs of twisted wires flush with the load bar of the wire manager.

Next, the method 600 includes a step 618 of trimming the wires to be flush with the distal end of the load bar 302 of the wire manager 300. A wire cutter can be used to trim the wires. FIG. 38 shows the wires after completion of step 618.

Figure 39:
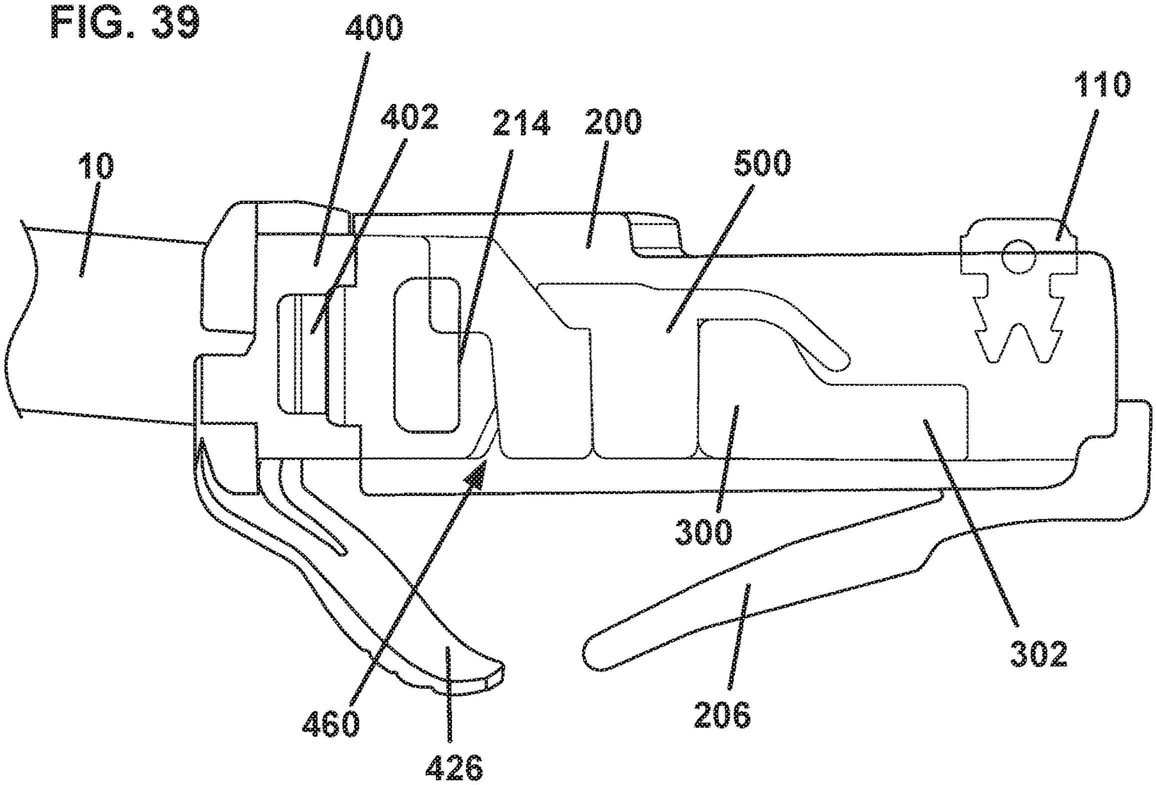
FIG. 39 shows the housing attached to the strain relief member.
Figure 40:
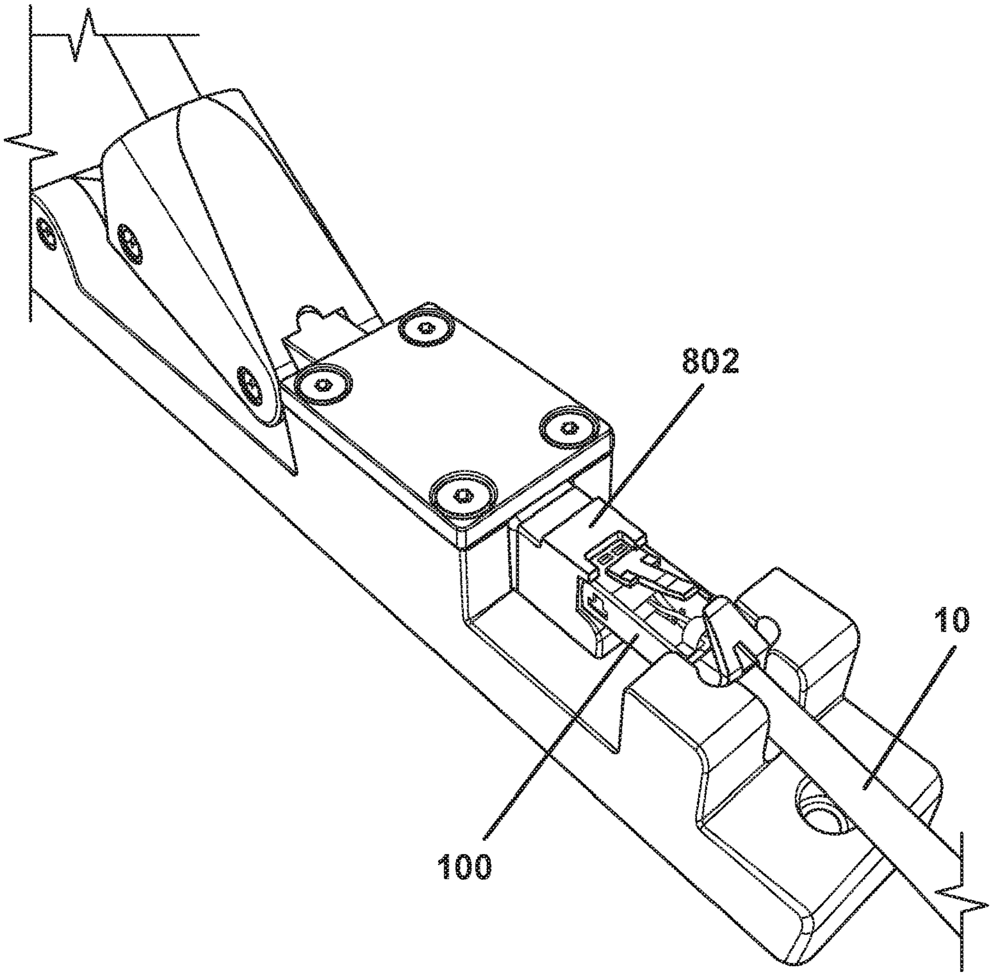
FIG. 40 shows a tool used to press the wire manager into the housing.

Next, the method 600 includes a step 620 of fitting the strain relief member 400 and the wire manager 300 into the housing 200. As described above, the tabs 402 of the strain relief member 400 are received by the slots 214 of the housing 200 such that the strain relief member 400 snap-fits into the housing 200. FIG. 39 shows the strain relief member 400 attached to the wire manager 300 in the final position 460. FIG. 40 shows a tool 802 that can be used to press the strain relief member 400 and the wire manager 300 into the housing 200.

Figure 41:
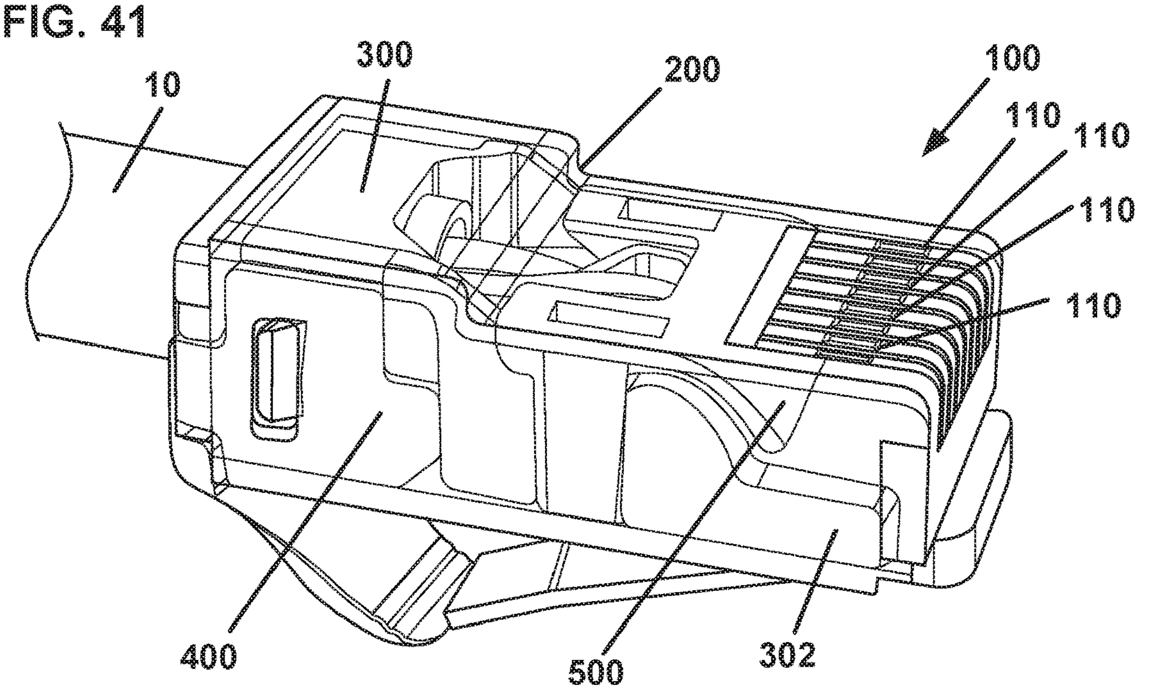
FIG. 41 shows the assembled modular plug.

Next, the method 600 includes a step 622 of crimping the wire contacts 110 held by the housing 200 to contact the twisted wires positioned by the load bar 302. FIG. 41 shows the modular plug 100 after completion of step 622 such that the wire contacts 110 are crimped into the twisted wires.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A modular plug for terminating a telecommunications cable comprising:
- a housing defining an internal cavity;
- a plurality of wire contacts, the plurality of wire contacts being configured to electrically connect to pairs of twisted wires in the telecommunications cable; and
- a wire manager fitted in the internal cavity of the housing, the wire manager including:
  - internal walls shaping a central channel;
  - opposing edges on the internal walls defining a gate in the central channel, the gate decreasing the width of the central channel from a first width to a second width; and
  - tabs projecting from the gate in the central channel, the tabs defining an upper portion and a lower portion in the gate in the central channel, and wherein the internal walls are flexible in opposite directions to allow a first pair of twisted wires to be contained by the tabs in the lower portion of the gate in the central channel.

2. The modular plug of claim 1, wherein the second width of the gate in the central channel is less than twice the diameter of a single wire from each pair of twisted wires.

3. The modular plug of claim 1, wherein the gate in the central channel is configured to hold the first pair of twisted wires in a stacked vertical arrangement.

4. The modular plug of claim 1, wherein the tabs decrease the second width between the opposing edges of the gate in the central channel to a third width.

5. The modular plug of claim 4, wherein the third width is less than the diameter of a single wire from each pair of twisted wires.

6. The modular plug of claim 1, wherein the tabs each have an upper edge and a lower edge, wherein the upper edge is rounded and the lower edge is planar.

7. The modular plug of claim 1, further comprising outer walls shaping side channels on opposite sides of the central channel, and opposing edges between the internal walls and outer walls defining gates in the side channels, the gates in the side channels decreasing the width of the side channels to the second width.

8. The modular plug of claim 7, wherein the gates in the side channels are offset with respect to the gate in the central channel about a long axis of the wire manager.

9. The modular plug of claim 1, further comprising a strain relief member that attaches to the wire manager in an intermediate position to partially restrain the telecommunications cable relative to the wire manager, and that is restrained by the housing in a final position to completely restrain the telecommunications cable relative to the wire manager.

10. The modular plug of claim 9, wherein the wire manager includes an interior surface and the strain relief member includes a corresponding interior surface such that when the strain relief member is attached to the wire manager, the interior surfaces of the wire manager and the strain relief member surround the protective outer jacket of the telecommunications cable.

11. The modular plug of claim 10, wherein the wire manager and strain relief member each include ribs on their respective interior surfaces, each rib configured to grip the protective outer jacket of the telecommunications cable.

12. The modular plug of claim 9, wherein the strain relief member includes an arm that receives a distal end of a latching handle of the housing.

13. The modular plug of claim 9, wherein the strain relief member includes sides each having a catch structured to snap fit the strain relief member onto the wire manager.

14. The modular plug of claim 1, further comprising a hood snap fitted onto the wire manager, the hood having a surface to restrain the wires from the pairs of twisted wires in the wire manager.

15. A modular plug for terminating a telecommunications cable comprising:
- a housing defining an internal cavity;
- a plurality of wire contacts, the plurality of wire contacts being configured to electrically connect to pairs of twisted wires in the telecommunications cable;
- a wire manager fitted in the internal cavity of the housing; and
- a strain relief member configured to attach to the wire manager in an intermediate position to partially restrain the telecommunications cable relative to the wire manager, and to be restrained by the housing in a final position to completely restrain the telecommunications cable relative to the wire manager.

16. The modular plug of claim 15, wherein the wire manager includes an interior surface and the strain relief member includes a corresponding interior surface such that when the strain relief member is attached to the wire manager, the interior surfaces of the wire manager and the strain relief member surround the protective outer jacket of the telecommunications cable.

17. The modular plug of claim 16, wherein the wire manager and strain relief member each include ribs on their respective interior surfaces, each rib configured to grip the protective outer jacket of the telecommunications cable.

18. The modular plug of claim 16, wherein the strain relief member includes an arm that receives a distal end of a latching handle of the housing.

19. The modular plug of claim 16, wherein the strain relief member includes sides each having a catch structured to snap fit the strain relief member onto the wire manager.

20. The modular plug of claim 19, wherein each catch of the strain relief member includes a tab having a forward inclined surface and a rearward orthogonal surface.

21. The modular plug of claim 15, wherein the wire manager includes internal walls shaping a central channel, opposing edges on the internal walls defining a gate in the central channel, and tabs projecting from the opposing edges defining an upper portion and a lower portion in the gate, and the internal walls are flexible in opposite directions to allow a first pair of twisted wires to be contained by the tabs in the lower portion of the gate.

22. The modular plug of claim 21, wherein the gates decrease the width of the central channel from a first width to a second width, and the second width in the central channel is less than twice the diameter of a single wire from each twisted pair of wires.

23. The modular plug of claim 22, wherein the tabs decrease the second width between the opposing edges of the gate in the central channel to a third width, and the third width is less than the diameter of a single wire from each pair of twisted wires.

24. The modular plug of claim 21, wherein the gate in the central channel is configured to hold the first pair of twisted wires in a stacked vertical arrangement.

25. The modular plug of claim 21, wherein the gates decrease the width of the central channel from a first width to a second width, and the tabs decrease the second width between the opposing edges of the gate in the central channel to a third width.

26. The modular plug of claim 21, wherein the tabs each have an upper edge and a lower edge, wherein the upper edge is rounded and the lower edge is planar.

27. The modular plug of claim 21, wherein the wire manager includes outer walls shaping side channels on opposite sides of the central channel, opposing edges between the internal walls and the outer walls defining a gate in each side channel, the gates decrease the width of the side channels from a first width to a second width, and the second width of the gates in the side channels is less than twice the diameter of a single wire from each pair of twisted wires.

28. The modular plug of claim 27, wherein the gates in the side channels are configured to hold pairs of twisted wires in a stacked vertical arrangement.

29. The modular plug of claim 27, wherein the internal walls curve in opposite directions towards the outer walls to partially define the gates in the side channels.

30. The modular plug of claim 27, wherein the gates in the side channels are offset with respect to the gate in the central channel about a long axis of the wire manager.

31. The modular plug of claim 15, further comprising a hood attached to the wire manager, the hood having a surface to restrain the wires from the pairs of twisted wires in the wire manager.

32. The modular plug of claim 31, wherein the hood includes sides each having a catch, each catch having an inclined lower surface and an orthogonal upper surface, the catches structured to snap fit the hood onto the wire manager.

33. A method of terminating a telecommunications cable with a modular plug comprising:
- attaching a wire manager to a terminal end of a telecommunications cable;
- attaching a strain relief member to the wire manager in an intermediate position;
- pressing a first pair of twisted wires from the telecommunications cable into a lower portion of a gate in a central channel of the wire manager;
- pressing a second pair of twisted wires from the telecommunications cable into an upper portion of the gate in the central channel of the wire manager;
- fitting the strain relief member and the wire manager into a housing; and
- crimping wire contacts into the first and second pairs of twisted wires.

34. The method of claim 33, wherein pressing the first pair of twisted wires into the lower portion of the gate in the central channel includes pressing the first pair of twisted wires beyond tabs projecting from opposing edges of the gate in the central channel.

35. The method of claim 33, wherein pressing the first pair of twisted wires into the lower portion of the gate in the central channel further includes flexing internal walls that define the central channel, and thereby allowing the first pair of twisted wires to be pressed into the lower portion of the gate beyond tabs projecting from opposing edges of the gate in the central channel.

36. The method of claim 33, wherein fitting the strain relief member and the wire manager into the housing includes moving the position of the strain relief member relative to the wire manager from the intermediate position to a final position.

37. The method of claim 33, further comprising attaching a hood to the wire manager, the hood having a surface that restrains the first and second pairs of twisted wires in the wire manager.

38. A modular plug for terminating a telecommunications cable comprising:
- a housing defining an internal cavity;
- a plurality of wire contacts inserted into the housing;
- a wire manager fitted in the internal cavity of the housing; and
- a strain relief member configured to attach to the wire manager in an intermediate position to partially restrain the telecommunications cable relative to the wire manager, and to move into a final position when the wire manager is fitted into the housing to completely restrain the telecommunications cable relative to the wire manager.

39. A method of terminating a telecommunications cable with a modular plug comprising:
- attaching a wire manager to a terminal end of a telecommunications cable;
- attaching a strain relief member to the wire manager in an intermediate position;
- inserting first, second, third, and fourth pairs of twisted wires from the telecommunications cable into the wire manager;
- fitting the wire manager and the strain relief member into a housing causing the strain relief member to move from the intermediate position to a final position; and
- crimping wire contacts into the first, second, third, and fourth pairs of twisted wires.

40. A modular plug for terminating a telecommunications cable comprising:
- a housing;
- a wire manager fitted into the housing, the wire manager including:
  - walls shaping at least a central channel; and
- opposing edges on the walls defining a gate in the central channel, wherein the gate is structured to contain a first pair of twisted wires in a lower portion of the gate and a second pair of twisted wires in an upper portion of the gate.

41. The modular plug of claim 40, wherein the gate includes a separator feature that contains the first pair of twisted wires in the lower portion of the gate.

42. The modular plug of claim 41, wherein the separator feature includes tabs that project from opposite sides of the gate.

43. The modular plug of claim 42, wherein the gate enables the first pair of twisted wires to be pressed beyond the tabs, and thereafter be contained by the tabs in the lower portion.

* * * * *